(12) United States Patent
Chen

(10) Patent No.: US 10,667,367 B2
(45) Date of Patent: *May 26, 2020

(54) APP BASED FREE SETTING METHOD FOR SETTING OPERATING PARAMETER OF SECURITY LIGHT

(71) Applicant: Chia-Teh Chen, Taipei (TW)

(72) Inventor: Chia-Teh Chen, Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/173,269

(22) Filed: Oct. 29, 2018

(65) Prior Publication Data

US 2020/0029408 A1 Jan. 23, 2020

Related U.S. Application Data

(63) Continuation of application No. 15/255,493, filed on Sep. 2, 2016, now Pat. No. 10,154,564, which is a
(Continued)

(51) Int. Cl.
*H05B 37/02* (2006.01)
*H05B 33/08* (2020.01)
(Continued)

(52) U.S. Cl.
CPC ............ *H05B 47/11* (2020.01); *F04D 25/06* (2013.01); *F04D 25/088* (2013.01); *F04D 27/004* (2013.01); *F04D 29/005* (2013.01); *F04D 29/325* (2013.01); *F21V 33/0096* (2013.01); *G06F 3/04847* (2013.01);
(Continued)

(58) Field of Classification Search
CPC ............ H05B 37/0218; H05B 33/0815; H05B 33/0818; H05B 33/0824; H05B 33/0827; H05B 33/0854; H05B 33/0863; H05B 33/0872; H05B 37/0227; H05B 37/0272; H05B 37/0281; F04D 25/06; F04D 25/088; F04D 25/004; F04D 25/005; F04D 25/325; F21V 33/0096; G06F 3/04847; G06F 3/04883; G06F 3/04886; G08B 15/00;
(Continued)

(56) References Cited

U.S. PATENT DOCUMENTS 5,491,463 A 2/1996 Sargeant et al.
6,473,608 B1 * 10/2002 Lehr .................. G05F 1/66
455/402
(Continued)

*Primary Examiner* — Brandon S Cole
(74) *Attorney, Agent, or Firm* — Rosenberg, Klein & Lee

(57) ABSTRACT

An on line free setting method for setting an operating parameter of a lighting device is disclosed. The method involves using a user interface APP comprising at least one free setting algorithm preloaded in a mobile device to transform a user's setting decision into an operating variable of an operating parameter of the lighting device, wherein the user interface APP is operable on a touch screen panel of the mobile device; wherein the free setting algorithm is a capacity scale simulation process implemented by operating a visual configuration of a free setting operator interacting with a capacity scale simulator and an indicator of the capacity operating rate to facilitate making the user's setting decision, wherein the operating parameter is used for controlling various functional performances of the lighting device including light intensity, light color temperature, delay time and detection sensitivity.

60 Claims, 19 Drawing Sheets

Related U.S. Application Data continuation-in-part of application No. 15/072,602, filed on Mar. 17, 2016, now Pat. No. 9,560,719, which is a continuation of application No. 14/487,334, filed on Sep. 16, 2014, now Pat. No. 9,326,362, which is a continuation-in-part of application No. 13/222,090, filed on Aug. 31, 2011, now Pat. No. 8,866,392.

(51) Int. Cl.

| | | |
|---|---|---|
| *H05B 37/00* | (2006.01) | |
| *G06F 7/06* | (2006.01) | |
| *G09G 5/00* | (2006.01) | |
| *G06F 17/00* | (2019.01) | |
| *H05B 47/11* | (2020.01) | |
| *F21V 33/00* | (2006.01) | |
| *G06F 3/0488* | (2013.01) | |
| *G06F 3/0484* | (2013.01) | |
| *F04D 25/08* | (2006.01) | |
| *F04D 25/06* | (2006.01) | |
| *F04D 27/00* | (2006.01) | |
| *F04D 29/00* | (2006.01) | |
| *F04D 29/32* | (2006.01) | |
| *G08B 15/00* | (2006.01) | |
| *H05B 45/10* | (2020.01) | |
| *H05B 45/20* | (2020.01) | |
| *H05B 45/37* | (2020.01) | |
| *H05B 45/44* | (2020.01) | |
| *H05B 45/46* | (2020.01) | |
| *H05B 47/16* | (2020.01) | |
| *H05B 47/19* | (2020.01) | |
| *H05B 47/105* | (2020.01) | |
| *G08B 13/189* | (2006.01) | |
| *F21Y 115/10* | (2016.01) | |

(52) U.S. Cl.
CPC ...... *G06F 3/04883* (2013.01); *G06F 3/04886* (2013.01); *G08B 15/00* (2013.01); *H05B 33/0815* (2013.01); *H05B 33/0863* (2013.01); *H05B 45/10* (2020.01); *H05B 45/20* (2020.01); *H05B 45/37* (2020.01); *H05B 45/44* (2020.01); *H05B 45/46* (2020.01); *H05B 47/105* (2020.01); *H05B 47/16* (2020.01); *H05B 47/19* (2020.01); *F21Y 2115/10* (2016.08); *G08B 13/189* (2013.01); *Y02B 20/42* (2013.01); *Y02B 20/44* (2013.01); *Y02B 20/46* (2013.01)

(58) Field of Classification Search
CPC ... G08B 13/189; F21Y 2115/10; Y02B 20/42; Y02B 20/44; Y02B 20/46
USPC .................................................. 315/290–311
See application file for complete search history.

(56) References Cited

U.S. PATENT DOCUMENTS

| | | |
|---|---|---|
| 6,548,967 B1 | 4/2003 | Dowling et al. |
| 6,559,757 B1 | 5/2003 | Deller et al. |
| 7,565,225 B2 | 7/2009 | Dushane et al. |
| 7,880,394 B2 | 2/2011 | Sibalich et al. |
| 7,948,189 B2 | 5/2011 | Ahmed |
| 8,035,320 B2 | 10/2011 | Sibert |
| 8,325,040 B2 | 12/2012 | Nassimi |
| 8,532,850 B2 * | 9/2013 | Cooper ................. B60T 13/665 375/258 |
| 9,134,004 B2 * | 9/2015 | Wacholder ................ F21V 5/00 |
| 9,832,844 B2 * | 11/2017 | Mans ................ H05B 37/0254 |
| 2004/0003073 A1 * | 1/2004 | Krzyzanowski .... H04L 12/2803 709/223 |
| 2006/0123053 A1 | 6/2006 | Scannell, Jr. |

* cited by examiner

APP BASED FREE SETTING METHOD FOR SETTING OPERATING PARAMETER OF SECURITY LIGHT

CROSS-REFERENCE TO RELATED APPLICATIONS

This application is a continuation of Non-Provisional application Ser. No. 15/255,493 filed on Sep. 2, 2016, currently pending. The application Ser. No. 15/255,493 is a continuation-in-part of Non-Provisional application Ser. No. 15/072,602 filed on Mar. 17, 2016, now U.S. Pat. No. 9,560,719. The U.S. Pat. No. 9,560,719 is a continuation of Non-Provisional application Ser. No. 14/487,334 filed on Sep. 16, 2014, now U.S. Pat. No. 9,326,362. The U.S. Pat. No. 9,326,362 is a continuation-in-part of Non-Provisional application Ser. No. 13/222,090 filed on Aug. 31, 2011, now U.S. Pat. No. 8,866,392.

BACKGROUND

1. Technical Field

The present disclosure relates to a lighting apparatus, in particular, to a security light with sensors.

2. Description of Related Art

Lighting sources such as the fluorescent lamps, the incandescent lamps, the halogen lamps, and the light-emitting diodes (LED) are commonly found in lighting apparatuses for illumination purpose. Photo sensors are often utilized in outdoor lighting applications for automatic illuminations, known as the Photo-Control (PC) mode. Timers may be used in the PC mode for turning off the illumination or for switching to a lower level illumination of a lighting source after the lighting source having delivered a high level illumination for a predetermined duration, referred as the Power-Saving (PS) mode. Motion sensors are often used in the lighting apparatus for delivering full-power illumination thereof for a short duration when a human motion is detected, then switching back to the PS mode. Illumination operation controls such as auto-illumination in accordance to the background brightness detection, illumination using timer, illumination operation control using motion sensing results (e.g., dark or low luminous power to fully illuminated), and brightness control are often implemented by complex circuitries. In particular, the design and construction of LED drivers are still of a complex technology with high fabrication cost. With increasing popularity of mobile devices, there exists a good opportunity to elaborate operating functions of the external control unit installed with the motion sensing security light disclosed in U.S. Pat. No. 9,326,362 B2 by utilizing APP based remote control technology. The term APP is generally referred to an application program pre-loaded in a mobile device, such as in a smart cellular phone, for executing customer-designed functions by a user.

SUMMARY

An exemplary embodiment of the present disclosure provides a two-level LED security light with motion sensor which may switch to a second level illumination in the Power-Saving (PS) mode for a predetermined duration time when a human motion is detected thereby achieve warning purpose using method of electric current or lighting load adjustment. Furthermore, prior to the detection of an intrusion, the LED security light may be constantly in a first level illumination to save energy, wherein the first level illumination may be a complete light off or a low level ambient light illumination.

An exemplary embodiment of the present disclosure provides a two-level LED security light, comprising a light emitting unit, a loading and power control unit, a photo sensor, a motion sensor, a power supply unit, and an external control unit coupled with the loading and power control unit. The light emitting unit comprises at least one LED, or the light emitting unit is a LED lamp. The loading and power control unit comprises a microcontroller or an application specific integrated circuit (ASIC) electrically coupled with a semiconductor switching device, wherein the semiconductor switching device is electrically connected in series with the power supply unit and the light emitting unit, wherein the microcontroller or ASIC, with program codes outputs a pulse width modulation (PWM) signal to control the conduction period $T_{on}$ and the cut-off period $T_{off}$ of the semiconductor switching device for delivering different average electric currents from the power supply unit to drive the light emitting unit for generating different illuminations, wherein the microcontroller or ASIC controls the semiconductor switching device respectively to have a first $T_{on}$ and a second $T_{on}$ of the conduction period such that the light emitting unit respectively generates a first level and a second level illumination characterized by light intensity and/or color temperature according to the signals received from the photo sensor and the motion sensor, wherein the external control unit is for setting illumination characteristics of at least one of the first level illumination and the second level illumination of the light emitting unit.

Another exemplary embodiment of the present disclosure provides a two-level security light control device applicable to AC lighting sources, comprising a power supply unit, a photo sensor, a motion sensor, a loading and power control unit, a zero-crossing detection circuit, a phase controller, and an external control unit coupled with the loading and power control unit. The phase controller is in-series connected to an AC lighting source and an AC power source, wherein the loading and power control unit comprises a microcontroller with program codes to control a conduction period of the phase controller thereby to adjust the average power of the AC lighting source, wherein when an ambient light detected by the photo sensor is lower than a predetermined value, the AC lighting source is turned on by the loading and power control unit thereby to generate a first level illumination and when the ambient light detected by the photo sensor is higher than the predetermined value, the AC lighting source is turned off by the loading and power control unit; when an intrusion is detected by the motion sensor, the loading and power control unit changes the average power of the AC lighting source and a second level illumination is generated for a predetermined duration, wherein the first level and the second level illumination are characterized by specific light intensity and/or color temperature, wherein the external control unit is for setting illumination characteristics of at least one of the first level illumination and the second level illumination of the light emitting unit.

Another one exemplary embodiment of the present disclosure provides a two-level security light control device applicable to AC lighting sources, comprising a power supply unit, a photo sensor, a motion sensor, a loading and power control unit, a zero-crossing detection circuit, a plurality of phase controllers, and an external control unit coupled with the loading and power control unit. The plurality of phase controllers are respectively series-connected to a plurality of alternating current (AC) lighting sources, wherein the pairs of phase controller-AC lighting source are parallel-connected to an AC power source, wherein the loading and power control unit comprises a microcontroller for writing operation program to respectively control conduction periods of the phase controllers thereby to respectively adjust the average powers of the AC lighting sources, wherein when an ambient light detected by the photo sensor is lower than a predetermined value, the AC lighting sources are turned on by the loading and power control unit to generate a first level illumination for a predetermined duration and when the ambient light detected by the photo sensor is higher than the predetermined value, the AC lighting sources are turned off, wherein when an intrusion is detected by the motion sensor, the loading and power control unit changes the average power of the AC lighting sources to generate a second level illumination for a predetermined duration, wherein the first level and the second level illumination are characterized by specific light intensity and color temperature, wherein the external control unit is for setting the illumination characteristics of at least one of the first level illumination and the second level illumination of the AC lighting sources.

Another one exemplary embodiment of the present disclosure represents a security light comprising a loading and power control unit connected with a wireless platform wherein system functions of an external control unit and a time setting unit are integrated and implemented by APP based technology to facilitate free setting operating parameters of a security light by a user on a wireless basis, wherein an indicator showing an instantaneous value of capacity operating rate is designed to facilitate the user's selection decision. In fact, the time setting unit disclosed in the U.S. Pat. No. 9,326,362 B2 & etc. as a separate component could have been included in the definition of the external control unit by its nature.

Another one exemplary embodiment of the present disclosure uses an APP based software technology to operate on line free settings of various operating parameters of a security light. The technology enables a user to observe and thereby arbitrarily select any level of an operating parameter in a designated category within its maximum circuitry capacity on an on line computing basis according to his or her observation by operating a free setting algorithm designed and loaded in a mobile device and the security light.

Another exemplary embodiment of the present disclosure is a user interface APP designed and loaded in a mobile device operable on the touch screen panel of the mobile device, wherein the APP operates to transform the user's setting decision(s) into operating variable(s) usable for processing, computing and setting the operating parameter(s) of the security light, wherein the operating variable(s) is wirelessly transmitted via the mobile device to the security light; wherein a software program is loaded in a microcontroller of the security light, comprising at least one subroutine programmed to use the value(s) of the operating variable(s) for computing, adjusting and setting at least one operating parameter of the security light.

Another exemplary embodiment of the present disclosure provides a user interface APP, designed on the touch screen panel of the mobile device, comprising at least one free setting algorithm for setting at least one operating parameter. The free setting algorithm is a capacity scale simulation implemented by a visual configuration of a free setting operator incorporated with a capacitor scale simulator and the indicator of the capacity operating rate to facilitate the user's decision making process in setting a desired level of operating parameter, wherein when the free setting operator is activated by the user to interact with the capacity scale simulator, the user interface APP responsively manages to gradually adjust the value of the capacity operating rate according to the instantaneous state of interaction between the free setting operator and the capacity scale simulator with the indicator of the capacity operating rate simultaneously showing an instantaneous value of the capacity operating rate, wherein the capacity operating rate shown in the indicator can be an operating percentage or an actual operating value of the relevant operating parameter, wherein when a free setting motion of the free setting operator is ceased with at least one setting decision, the user interface APP manages to generate the operating variable(s) corresponding to the selection of the capacity operating rate(s) and accordingly operates to transmit a wireless instruction signal carrying a message of the operating variable to the lighting device.

In the present disclosure two types of capacity scale simulators are illustrated as exemplary embodiments; the first one is a virtual track and the second one is a capacity free running subroutine. When a virtual track is used as the capacity scale simulator, the free setting algorithm is implemented by a visual configuration of the free setting operator coupled with the virtual track and the indicator of the capacity operating rate, wherein the virtual track is designed on the touch screen panel of the mobile device in the relevant free setting algorithm, wherein the free setting operator is slidable by the user's finger along the virtual track with the indicator of the capacity operating rate simultaneously showing an instantaneous value of the changing capacity operating rate while the sliding motion of the free setting operator is being conducted, wherein the value shown in the indicator of the capacity operating rate can be an operating percentage or an actual operating value of the operating parameter, wherein the full length of the virtual track represents a simulation of the value of the maximum operating capacity of a relevant operating parameter characterized by a relevant circuitry, wherein the capacity operating rate is determined by a parking location of the free setting operator on the virtual track when the sliding motion stops. When the capacity scale simulator is a capacity free running subroutine with the free setting operator being a virtual button, the free setting algorithm is implemented by a visual configuration of the virtual button, the capacity free running subroutine integrated with the virtual button and the indicator of the capacity operating rate, wherein the virtual button is designed on the touch screen panel of the mobile device in the relevant free setting algorithm, wherein when the virtual button is continuously touched by a finger of the user, the user interface APP operates to activate the capacity free running subroutine to gradually increase the capacity operating rate from a minimum level to a maximum level and then from the maximum level to the minimum level to complete a full cycle of free running motion, wherein during a free running cycle period the instantaneous value of the changing capacity operating rate is simultaneously shown in the indicator of the capacity operating rate, wherein the value of capacity operating rate can be an operating percentage or an actual operating value of the operating parameter, wherein the moment at which the user's finger is removed from the virtual button, the capacity free running motion is instantly ceased with the capacity operating rate thereby being locked in at the instantaneous level of the last moment of the free running motion, wherein the time length of a half cycle period of the free running motion represents a simulation of the value of the maximum operating capacity of a relevant operating parameter characterized by a relevant circuitry, wherein the capacity operating rate is determined by the time length the user's finger staying in touch screen panel with the virtual button compared with the time length of a half cycle period of the free running motion.

The free setting algorithm of this embodiment is often used for setting time duration related operating parameters such as the light-on duration triggered by the motion sensor or triggered by the photo sensor, though it can also be used for sensitivity related operating parameters such as detection distance setting for the motion sensor or for the photo sensitivity settings. When the free setting operator determines a capacity operating rate according to the value shown in the capacity operating indicator, a wireless instruction signal carrying the message of the selected capacity operating rate coded with a category of the operating parameter is thereby transmitted by the APP software via a wireless transmission means (Wi-Fi, Blue Tooth, Zig Bee or Radio Frequency) of the mobile device, upon receiving such wireless signal(s) carrying the message of the selected capacity operating rate coded with a category of the operating parameter from the wireless receiver of the security light, the microcontroller with APP software responsively activates a corresponding subroutine to interpret, compute and convert the capacity operating rate into a proportionate time duration value and output a time delay control signal to control the duration of delay time selected by the end user. The confirmation of each selection of capacity operating rate can be done at the time when all relevant capacity operating rates of all categories of operating parameters are completely set and one confirmation by a touch on a confirmation button will simultaneously send all wireless signals carrying various operating rates coded with different operating parameters. Additionally only one value of each operating parameter computed by the microcontroller is retained and stored in a memory of the microcontroller for repetitive performance until a resetting of at least one operating parameter is initiated by the user then the specific category of operating parameter(s) will be replaced with newly computed value(s).

Another one exemplary embodiment of the present disclosure, wherein the operating parameters comprise setting of timer for performing a manual override illumination triggered by the photo sensor, setting of time length of light-on duration triggered by the motion sensor, setting of illumination level triggered by the photo sensor, setting of illumination level triggered by the motion sensor, setting of detection range of the motion sensor, setting of ambient illumination level at which the photo sensor operates to switch on the motion sensor or turn on the sensing security light or alternatively switching the performance state of the security light alternately between a motion sensing security mode and a general illumination mode.

In summary the present disclosures are a continuation of technology enhancement to elaborate operating functions of the external control unit installed with the motion sensing security light disclosed in former applications with a focus on an APP based new remote control technology usable for setting operating parameters of a lighting device. The present invention is applicable to a general lighting device, a single level security light, two level security light or multi-level/life style security light. The lighting load can be a non-linear lighting load such as LED lamp, a linear load such as halogen lamp or any electrically energize-able light emitting material. For single level security light, the motion sensor is switched on at dusk by the photo sensor with the light remaining off, wherein when a motion intrusion is detected by the motion sensor, the light is instantly turned on for a short time duration and in the absence of continued motion intrusion(s) detected the light is then turned off. For the two level security light, the motion sensor is switched on at dusk and at the same time the light is turned on to perform a low level illumination mode, wherein when a motion intrusion is detected by the motion sensor, the light is instantly managed to change from a low level illumination mode to a high level illumination mode for a short time duration before being switched back to the low level illumination mode, the light is automatically switched off at dawn by the photo sensor. For the multi-level/life style security light, the light is automatically turned on at dusk to perform a first level illumination mode for a first predetermined duration and then is switched to a low level illumination mode, wherein when a motion intrusion is detected, the light is instantly managed to perform a high level illumination mode for a second predetermined duration, in the absence of further motion(s) detected, the light is then switched back to the low level illumination mode till at dawn the photo sensor manages to turn off the light and to disconnect the motion sensor.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS OF THE SUPPLEMENT

Figure 1:
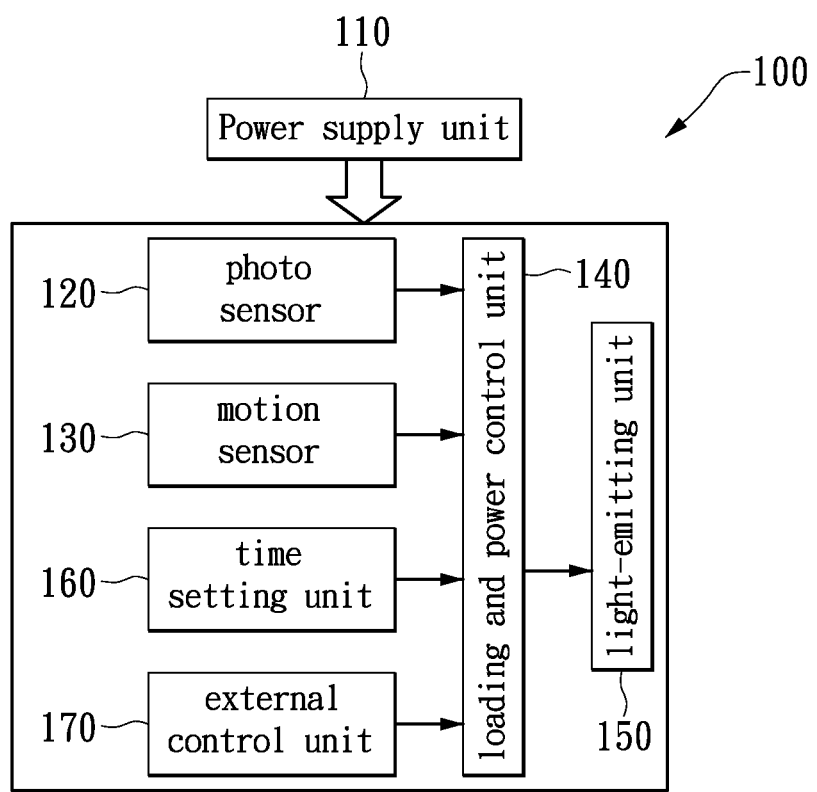
FIG. 1 schematically illustrates a block diagram of a LED security light in accordance with an exemplary embodiment of the present disclosure.

Reference is made in detail to the exemplary embodiments of the present disclosure, examples of which are illustrated in the accompanying drawings. Wherever possible, the same reference numbers are used in the drawings and the description to refer to the same or alike parts.

Refer to FIG. 1, which schematically illustrates a block diagram of a security light. A security light (herein as the lighting apparatus) 100 includes a power supply unit 110, a photo sensor 120, a motion sensor 130, a loading and power control unit 140, a light emitting unit 150, a time setting unit 160 and an external control unit 170. The power supply unit 110 is used for supplying power required to operate the system, wherein the associated structure includes the known AC/DC power converter. The external control unit 170 is coupled with the loading and power control unit 140, wherein the external control unit 170 can be manipulated by the user for adjusting illumination characteristics of at least one of a first level illumination and a second level illumination of the light emitting unit 150. The first level and the second level illumination are characterized by light intensity and/or color temperature. For example, the first level illumination and the second level illumination may be a low level illumination (or no illumination) and a high level illumination respectively, but the present disclosure is not so restricted. In other embodiment, the first level illumination may be a first color temperature level illumination, and the second level illumination may be a second color temperature level illumination. The photo sensor 120 may be a photo-resistor, which may be coupled to the loading and power control unit 140 for determining daytime or nighttime in accordance to the ambient light. The motion sensor 130 may be a passive infrared ray sensor (PIR), a microwave motion sensor or an ultrasonic motion sensor, which is coupled to the loading and power control unit 140 and is used to detect motion intrusions. When a person is entering a predetermined detection zone of the motion sensor 130, a sensing signal thereof is responsively transmitted to the loading and power control unit 140.

The loading and power control unit 140 comprises a controller circuitry which may be implemented by a microcontroller, a microprocessor, an ASIC (application specific integrated circuit) or a programmable integrated circuit coupled to the light emitting unit 150. The loading and power control unit 140 controls the illumination levels of the light emitting unit 150 in accordance to the sensing signal(s) outputted by the photo sensor 120 and the motion sensor 130. The light emitting unit 150 includes a plurality of LEDs and switching components. The loading and power control unit 140 may control the light emitting unit 150 to generate different levels of illumination modes. The time setting unit 160 coupled with the loading and power control unit 140 is used to preset various specific time durations respectively for different illumination modes of the light emitting unit 150. The time setting unit 160 is effectively a type of external control device which could be combined and considered as a component of the external control unit 170.

For a single level LED security light wherein when an ambient light detected by the photo sensor 120 is lower than a predetermined value, the loading and power control unit 140 manages to switch on the motion sensor 130, wherein when the ambient light detected by the photo sensor 120 is higher than a predetermined value, the loading and power control unit 140 thereby manages to switch off the motion sensor 130, wherein when a motion intrusion is detected by the motion sensor 130, the loading and power control unit 140 responsively manages to turn on the light emitting unit 150 to perform a high level illumination mode for a predetermined short time duration and then operates to turn off the light emitting unit 150 in the absence of any more motion intrusion;

For a two-level LED security light, wherein when the ambient light detected by the photo sensor 120 is lower than a predetermined value the loading and power control unit 140 operates to turn on the light emitting unit 150 to generate a low level illumination mode, wherein when the ambient light detected by the photo sensor 120 is higher than a predetermined value (i.e., dawn), the loading and power control unit 140 turns off the light emitting unit 150, wherein when a human motion is detected by the motion sensor 130, the loading and power control unit 140 manages to increase the electric current which flows through the light emitting unit 150, to generate a high level illumination for a short predetermined duration preset by the time setting unit 160. After the short predetermined duration, the loading and power control unit 140 may automatically reduce the electric current that flows through the light emitting unit 150 thus to have the light emitting unit 150 return to low level illumination for saving energy.

For a multi-level/life style LED security light, wherein when the photo sensor 120 detects that the ambient light is lower than a predetermined value (i.e., nighttime), the loading and power control unit 140 operates to turn on the light emitting unit 150 to generate a first level illumination mode for a first predetermined duration preset by the time setting unit 160 and is then switched to a second level illumination mode with a lower light intensity, wherein when the photo sensor 120 detects that the ambient light is higher than a predetermined value (i.e., dawn), the loading and power control unit 140 manages to turn off the light emitting unit 150, wherein when the motion sensor 130 detects a human motion, the loading and power control unit 140 manages to increase the electric current which flows through the light emitting unit 150, to generate a high level illumination for a second predetermined duration with relatively shorter time length preset by the time setting unit 160 and after the second predetermined duration, the loading and power control unit 140 automatically reduces the electric current that flows through the light emitting unit 150 thus to let the light emitting unit 150 return to the second level illumination mode for saving energy.

Figure 2A:
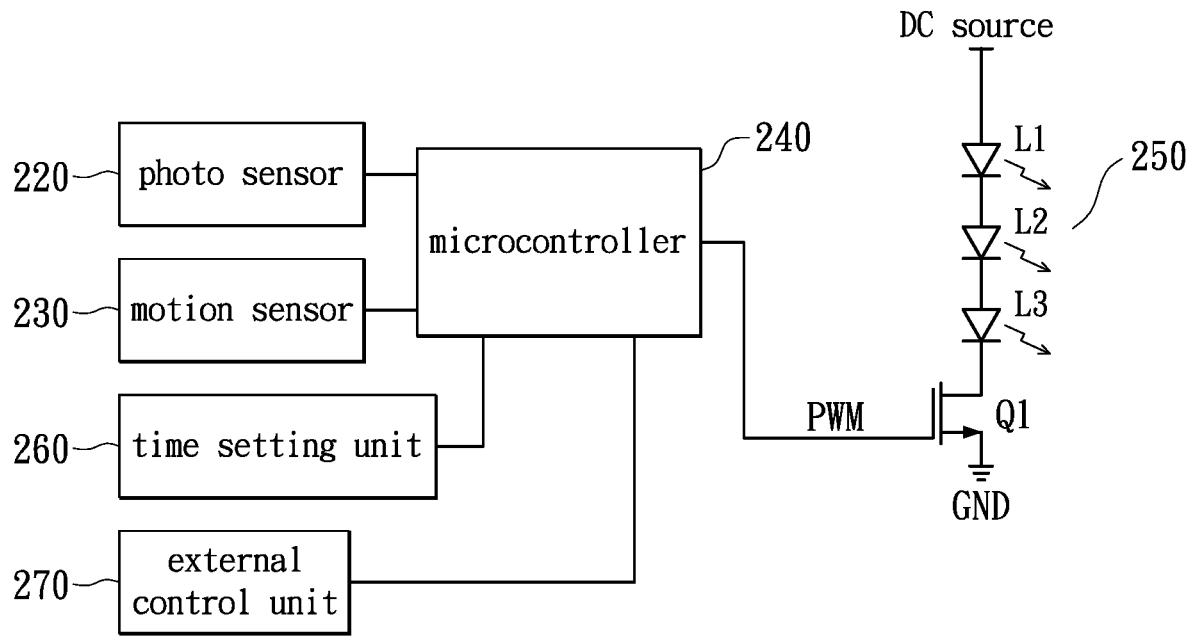
FIG. 2A illustrates a schematic diagram of a LED security light in accordance to the first exemplary embodiment of the present disclosure.

Refer to FIG. 2A in view of FIG. 1, FIG. 2A illustrates a schematic diagram of a two-level LED security light in accordance to the first exemplary embodiment of the present disclosure. The photo sensor 120 may be implemented by a photo sensor 220; the motion sensor 130 may be implemented by a motion sensor 230; the loading and power control unit 140 may be implemented by a microcontroller 240 may output a pulse width modulation (PWM) signal, wherein, not depicted explicitly in FIG. 2A, the PWM signal may be outputted and sent through a buffer component or a conditioner circuitry to the gate of transistor Q1; the time setting unit 260 is the time setting unit 160; and the external control unit 270 is the external control unit 170. The light emitting unit 250 includes three series-connected LEDs L1~L3. The LEDs L1~L3 is connected between a DC source and a transistor Q1, wherein an artisan of ordinary skill in the art will appreciate how to replace the transistor Q1 by other type of the semiconductor switching device. The DC source may be provided by the power supply unit 110. The transistor Q1 may be an N-channel metal-oxide-semiconductor field effect transistor (NMOS). The transistor Q1 is connected between the three series-connected LEDs L1~L3 and a ground GND. The loading and power control unit 140 implemented by the microcontroller 240 may output a pulse width modulation (PWM) signal to control the average electric current of the LEDs L1~L3. It is worth to note that the electric components depicted in FIG. 2A only serves as an illustration for the exemplary embodiment of the present disclose and hence the present disclosure is not limited thereto. The external control unit 270 may be an electronic switch being optionally a push button, a touch panel or an infrared ray sensor for inputting voltage signal to adjust illumination characteristics of at least one of the first level illumination and the second level illumination of the light emitting unit. Further, in another embodiment, the external control unit 270 may be a push button, a touch panel, an infrared ray sensor or a wireless remote control device coupled or wirelessly linked to a pin of the microcontroller of the loading and power control unit; wherein, when the push button, the touch panel, the infrared ray sensor or the remote control device is activated, a voltage signal is generated to trigger the microcontroller 240 for performing at least one of the two functional modes, for instance the manual setting and the free-running setting (which would be explained thereafter) of the illumination characteristics. The external control unit 270 may be electrically coupled to the microcontroller 240 (that is the loading and power control unit 140), such as utilizing electrical connection through conducting wire. In other embodiment, the external control unit 270 may be a remote control device, thus the external control unit 270 is wirelessly linked to the microcontroller 240 by using wireless techniques.

In addition, the microcontroller 240 is coupled to a time setting unit 260, wherein the time setting unit 260 may allow the user to configure on software base a virtual timer embedded in the microcontroller 240 for executing a subroutine for a predetermined duration to perform the first level or the second level illumination respectively in the PC mode or in the PS mode. Further, if the microcontroller 240 is coupled to a clock device, the time setting unit 260 may allow the user to set a clock time point instead of a predetermined duration for switching from the PC mode to the PS mode. However, the present disclosure is not limited thereto.

Figure 2B:
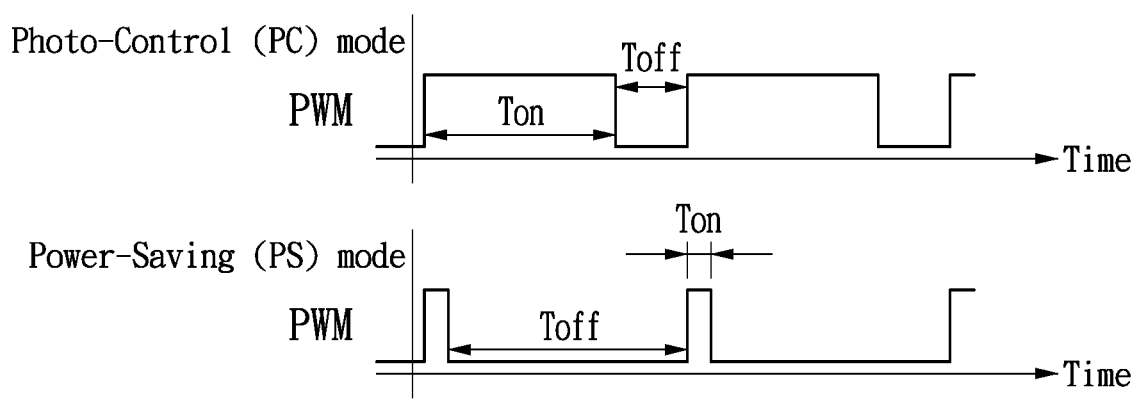
FIG. 2B graphically illustrates a timing waveform of a pulse width modulation (PWM) signal in accordance to the first exemplary embodiment of the present disclosure.

Refer to FIG. 2B concurrently, which graphically illustrates a timing waveform of a pulse width modulation (PWM) signal in accordance to the first exemplary embodiment of the present disclosure. In the PC mode, the PWM signal may be used to configure the transistor Q1 to have the conduction period $T_{on}$ being longer than the cut-off period $T_{off}$. On the other hand, in the PS mode, the PWM signal may configure the transistor Q1 to have the conduction period $T_{on}$ being shorter than the cut-off period $T_{off}$. In comparison of the illumination levels between the PC and PS modes, as the conduction period $T_{on}$ of transistor Q1 being longer under the PC mode, therefore have higher average electric current driving the light emitting unit 250 thereby generate high illumination, which may be classified as the high level illumination; whereas as the conduction period $T_{on}$ of transistor Q1 is shorter in the PS mode, therefore have lower average electric current driving the light emitting unit 250 thereby generate low illumination, which may be classified as the low level illumination.

The microcontroller 240 turns off the light emitting unit 250 during the day and activates the PC mode at night by turning on the light emitting unit 250 to generate the high level illumination for a short predetermined duration then return to the low level illumination thereby entering the PS mode. When the motion sensor 230 detects a human motion in the PS mode, the light emitting unit 250 may switch to the high level illumination for illumination or warning application. The light emitting unit 250 may return to the low level illumination after maintaining at the high level illumination for a short predetermined duration to save energy.

Please refer to FIG. 2A to further elucidate illumination level adjustment or setting. In order to adjust the illumination level of the light emitting unit 250, two exemplary control methods are applied by utilizing the external control unit 270. Specifically, the first exemplary method is a manual adjustment applicable when the loading and power control unit 240 executes the Power-Saving (PS) mode for generating a first level illumination. The first level illumination is preferred an illumination of low light intensity and/or low color temperature. Refer to FIG. 2A again, the microcontroller 240 may scan with its program codes a pin connected with the external control unit 270 and may detect control signal generated from the external control unit 270. The external control unit 270 may be preferable a push button. When the push button is pressed down by a user to ground the connecting pin of the microcontroller 270, a zero voltage is generated for a time duration until the push button is released, such that a control signal with a zero voltage of a time duration is generated manually by the user. The microcontroller 240 with program codes recognizes this control signal and by executing a subroutine generates a PWM signal to cause a conduction time period $T_{on}$ periodically varying within a preset range of 0 to 50% duty ($T_{on}$ is equal to $T_{off}$) for a time length controlled by the external control unit 270, such that the LEDs 250 generate illumination with light intensity level gradually and periodically increasing from zero to 50% of the maximum light intensity and then decreasing from 50% to zero to complete a repetitive cycle. The time length of such periodical illumination variation is equal to the time duration of zero voltage generated by pushing down the push button 270. Only when the push button 270 is released by the user, the periodical illumination variation is ended at an illumination level related to a specific $T_{on}$ value determined by the user; then the microcontroller 240 jumps out of the subroutine of periodical illumination variation and stores thereafter the corresponding $T_{on}$ value of the PWM signal in its memory to update a data base for generating a new first level illumination in the PS mode. In brief, by pressing down and releasing the push button 270 connected with a pin of the microcontroller 240, the illumination level of the light emitting unit 250 can be thus set manually by the user when the loading and power control unit 240 executes the PS mode. However, the present disclosure is not limited thereto.

The second exemplary method is a free-running setting by program codes of microcontroller in conjunction with the external control unit. Refer to FIG. 2A. When the lighting apparatus is turned on by the photo sensor 220, the microcontroller 240 starts its program codes by executing a subroutine in which PWM signal is generated with the conduction time period $T_{on}$ periodically varying within a preset range of 0 to 50% duty for a fixed time period, such that the LEDs 250 generate illumination with light intensity level gradually and periodically increasing from zero to 50% of the maximum light intensity and then decreasing from 50% to zero light intensity to complete a variation cycle. This periodical variation of the low illumination level can last freely for two or three cycles within the fixed time period which is preferable to be one minute. However, it is not to limit the present invention in this manner. Within the one-minute fixed time period, for instance, the periodical illumination variation may be ended by activating the external control unit 270. The external control unit 270 may be preferable a push button. When the push button is pressed down instantly by a user to ground the connecting pin of the microcontroller 270, a zero voltage is generated to trigger the microcontroller 240 wherein the microcontroller 240 jumps out of the subroutine to terminate the free-running illumination variation and stores the $T_{on}$ value of PWM signal corresponding to the time point when the external control unit 270 being activated. The stored $T_{on}$ value is used to update a data base for generating the first level illumination in the PS mode. The free-run of periodical illumination variation may automatically end when the one-minute fixed time period expires with the external control unit 270 not being operated by the user; in this case, the microcontroller 240 jumps out of the subroutine of free-run and acquires from its memory a preset or earlier $T_{on}$ value of PWM signal for generating the first level illumination in the PS mode until the lighting apparatus is turned off.

In brief, in a preferred embodiment of the present disclosure, a two-level LED security light may include a power supply unit, a photo sensor, a motion sensor, a loading and power control unit, a light emitting unit, a time setting unit and an external control unit. The external control unit is provided for adjusting or setting illumination level of LED light. The loading and power control unit is implemented by a microcontroller with program codes to operate the two-level LED security light. The microcontroller turns off the light emitting unit during the day and activates a Power-Saving (PS) mode at night by turning on the light emitting unit to generate a first level illumination, and upon human motion detection by switching the light emitting unit to generate a second level illumination for a short time duration. The illumination characteristics of first level illumination can be changed by activating the external control unit according to the user's demand. When the lighting apparatus is turned on, the microcontroller starts its program codes by firstly executing a subroutine with free-run for a fixed time length, such that the user can follow the gradual and periodical illumination variation to select an illumination level by operating the external control unit; thereafter, the microcontroller jumps out of the subroutine of free-run and executes the program codes of PS mode for generating the first level illumination with the selected level characteristics until the lighting apparatus is turned off. If within the fixed time length of free-run the external control unit is not activated, the microcontroller jumps out of the subroutine of free-run automatically and, with a data base of a preset or earlier level characteristics, executes program codes of PS mode for generating the first level illumination until the lighting apparatus is turned off. The level characteristics can also be further adjusted manually by the user when the loading and power control unit executes the PS mode. The external control unit may be preferable a push button. When in PS mode the light emitting unit generates a first level illumination, the user can press the push button for a while to observe the gradual and periodical changing of level characteristic, and then decide at a time point to release the push button to select a desired illumination level, such that to complete manual adjustment.

Figure 2C:
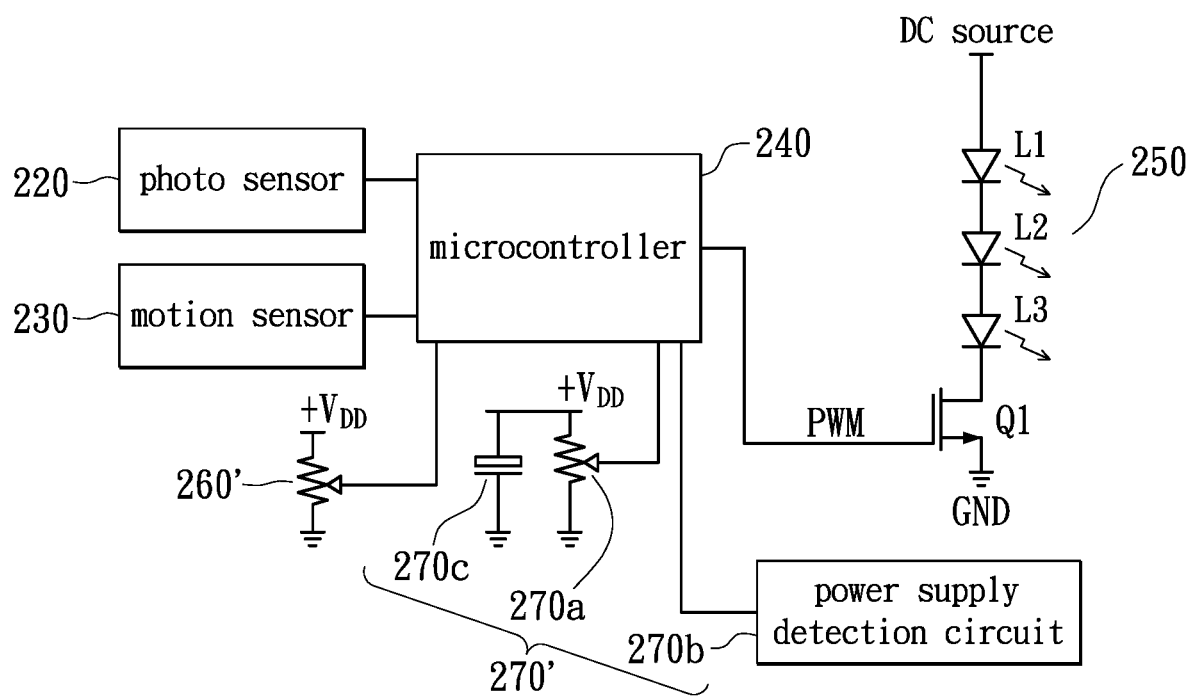
FIG. 2C illustrates in some detail a schematic diagram of a LED security light of FIG. 2A.

Please refer to FIG. 2C in view of FIG. 2A and FIG. 2B. Two preferred constructions respectively for the time setting unit 260' and the external control unit 270' are shown in FIG. 2C. The time setting unit 260' may be a voltage divider with variable resistor for setting predetermined time durations for the first level and the second level illumination. The external control unit 270' may include a voltage divider 270a which may comprise a variable resistor provided with a rotating knob to facilitate operation. For illumination level setting, the microcontroller operates with program codes preferably in conjunction with the voltage divider 270a and further with a power supply detection circuit 270b, an energy storage capacitor 270c and a power switch (not shown in FIG. 2C) for respectively manual and free-running setting of at least one of a first level illumination and a second level illumination of the two-level LED security light; details of adjusting illumination level with the external control unit 270' and other extra devices will be described later.

In order to adjust the illumination level of the light emitting unit 250, two exemplary control methods are applied by utilizing the external control unit 270*a* and the software technique incorporating with extra devices 270*b*-270*c*. Specifically, the first exemplary method is a manual adjustment applicable in the Power-Saving (PS) mode for generating a first level illumination. Refer to FIG. 2C again, the microcontroller 240 may scan with its program codes the voltage on a pin connected with the voltage divider 270*a* and may detect a voltage, in which the voltage across of the variable resistor (voltage divider 270*a*) may be varied manually when a user rotates the knob attached on the variable resistor (voltage divider 270*a*). The microcontroller 240 with program codes generates in response a PWM signal to cause a conduction time period $T_{on}$ proportional to a voltage received from the variable resistor (voltage divider 270*a*). The light emitting unit 250 illuminates accordingly with light intensity level characterized by the conduction time period $T_{on}$ controlled by the voltage of the variable resistor (voltage divider 270*a*). With the external control unit 270', the first illumination level of the light emitting unit 250 can be thus set manually by tuning the variable resistor (voltage divider 270*a*) when the loading and power control unit 240 executes the PS mode.

The second exemplary method is a free-running adjustment based on program codes of microcontroller in conjunction with a power supply detection circuit and an energy-stored capacitor. Refer to FIG. 2C, when the lighting apparatus is turned on, the microcontroller 240 starts its program codes firstly by executing a subroutine of free-run in which PWM signal is generated to cause the conduction time period $T_{on}$ periodically varying within a preset range of 0 to 50% duty for a fixed time period, such that the LEDs 250 generate illumination with light intensity level gradually and periodically increasing from zero to 50% of the maximum light intensity and then decreasing from 50% to zero to complete a variation cycle. This periodical variation of the low illumination level can last freely for two or three cycles within the fixed time period which is preferable to be one minute. However, it is not to limit the present invention in this manner. Within the one-minute fixed time period, for instance, the free-run of periodical illumination variation may be overridden by the user by turning off a power switch momentarily (for 1-2 seconds) and then switching it back on. At the moment when the power switch is turned off and then switched back on, the microcontroller 240 detects this OFF-ON event through a power supply detection circuit 270*b* and leaves the subroutine to terminate free-run, and simultaneously stores the $T_{on}$ value of PWM signal related to the time point of the OFF-ON event to update a data base for generating the first level illumination in the PS mode. In general, the user can follow the gradual and periodical free-run of the low level lighting variation and select a favorable light intensity level by promptly turning the power switch off and again on (short power interruption). After overriding by power interruption, the microcontroller 240 jumps out of the subroutine of free-run and continues its program codes to execute the PS mode in which the illumination level is determined by the user. The free-run of periodical lighting variation may end automatically when the fixed time period expires with power interruption not being detected; the microcontroller 240 jumps out of the subroutine of free-run and acquires from its memory a preset or earlier $T_{on}$ value of PWM signal for generating the first level illumination in the PS mode. Refer to FIG. 2C again, an energy storage capacitor 270*c* is connected between the high end and the ground of the working voltage $V_{DD}$. This capacitor 270*c* is for holding the voltage $V_{DD}$ to keep the circuits 240, 270*b* still working when electric power is interrupted for 1-2 seconds. Therefore, when overriding free-run by short power interruption, an instant zero voltage is detected by the power supply detection circuit 270*b* and recognized by the microcontroller 240 to perform function for selecting and setting a desired illumination level.

In another embodiment, refer to FIG. 1 again, when an ambient light detected by the photo sensor 120 is lower than a predetermined value, the light emitting unit 150 may be turned on thereby by the loading and power control unit 140 to generate an adjustable level illumination for a first predetermined duration and then turned off or switched to a low level illumination, when an intrusion is detected by the motion sensor 130, the light emitting unit 150 is turned on by the loading and power control unit 140 to generate a high level illumination for a second predetermined duration and then turned off or switched to a low level illumination until the next intrusion detection; when an ambient light detected by the photo sensor 120 is higher than the predetermined value, the light emitting unit 150 is turned off by the loading and power control unit. The time setting unit 160 is used to set the first and the second predetermined duration respectively for the adjustable level illumination and the high level illumination. The external control unit 170 is used in two setting modes for setting illumination characteristics of the adjustable level illumination; wherein the first setting mode is a manual setting, in which the illumination level of the light emitting unit is set in a preset range by activating the external control unit 170; wherein the second setting mode is a free-running setting, in which the light emitting unit performs a free-run of the adjustable level illumination with light intensity gradually and periodically increasing and then decreasing in a preset range to complete a cycle, wherein the free-run may be terminated by activation of the external control unit 170 at a time point corresponding to a specific light intensity level, such that the light emitting unit performs the adjustable level illumination constantly with the specific light intensity level being set thereof.

In still another embodiment, a lighting management device is provided. Refer to FIG. 1 again, the lighting management device applicable to a lighting load such as the light emitting unit 150. The lighting management device comprises the loading and power control unit 140, the power supply unit 110 and the external control unit 170 coupled with the loading and power control unit. The loading and power control unit 140 comprises a microcontroller (such as the microcontroller 240 shown in FIG. 2A) electrically coupled with a semiconductor switching device (such as the transistor Q1 shown in FIG. 2A). The external control unit 170 may be a push button, a touch panel, an infrared ray sensor or a remote control device coupled or wirelessly linked to a pin of the microcontroller. The semiconductor switching device is electrically connected in series with the power supply unit and the lighting load, such as the transistor Q1 is electrically connected in series with the DC source and the LEDs of the light emitting unit 250, wherein the microcontroller with written program code controls the conduction rate of the semiconductor switching device, wherein the external control unit 170 enables a user to select a desired illumination characteristic during a free running setting process performed by the lighting load, wherein the lighting load operates a free-run of illumination level by gradually and periodically changing the illumination characteristic, wherein the free-run may be terminated by activation of the external control unit 170 at a time point corresponding to a specific illumination characteristic selected by the user, wherein the microcontroller accordingly interprets the conduction rate of the semiconductor switching device at the time point when the external control unit 170 is activated and the free running is terminated to be the illumination characteristic set for illumination performance, the illumination characteristic is then memorized by the microcontroller for repetitive performance. Further, in one embodiment, the free run setting is terminated and the illumination characteristic of the lighting load is set by turning off a power switch instantly and turning it back on at the time point the lighting load performs a desired lighting characteristic selected by the user.

Figure 2D:
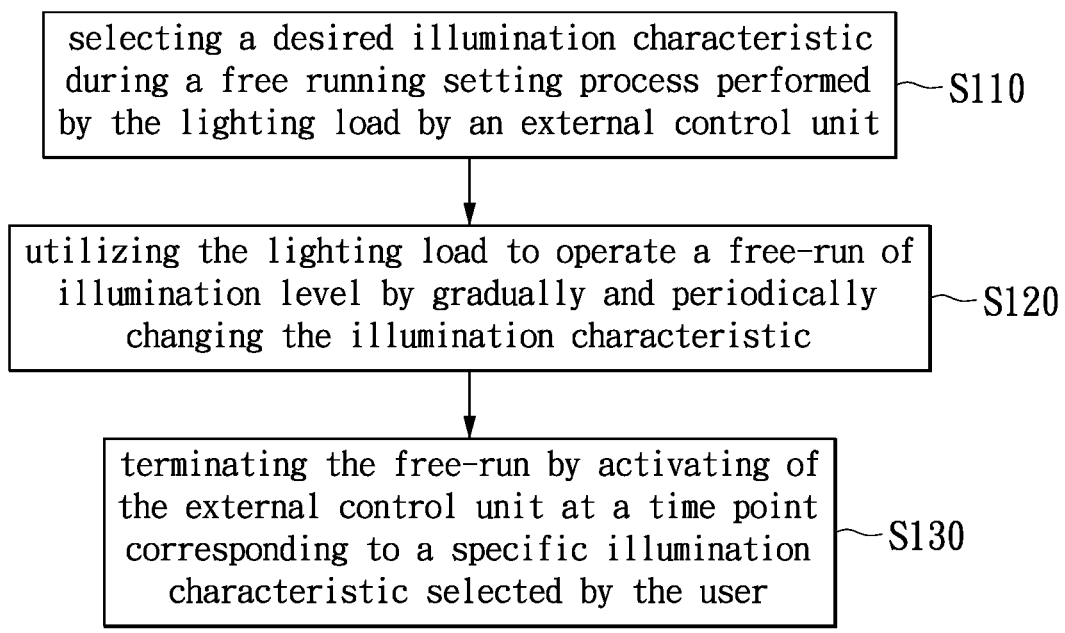
FIG. 2D illustrates a flow chart of a free running setting method in accordance with the first exemplary embodiment of the present disclosure.

According to the previous embodiment, a free running setting method with activation of external control unit or through power switch interruption is provided. Refer to FIG. 2D, the method comprises step S110: selecting a desired illumination characteristic during a free running setting process performed by the lighting load by an the external control unit; S120: utilizing the lighting load to operate a free-run of illumination level by gradually and periodically changing the illumination characteristic; and S130: terminating the free-run by activating of the external control unit or through power switch interruption at a time point corresponding to a specific illumination characteristic selected by the user, wherein the microcontroller accordingly interprets the conduction rate of the semiconductor switching device at the time point when the external control unit is activated or a power switch interruption is detected and the free running is terminated to be the illumination characteristic set for illumination performance, the illumination characteristic is then memorized by the microcontroller for repetitive performance.

In summary, in a preferred embodiment of the present disclosure, a two-level LED security light may employ an external control unit coupled to a loading and power control unit for adjusting or setting the illumination level of the LED light. The external control unit may be a push button, a voltage divider, a touch panel, an infrared ray sensor or other devices for generating control signals having different attributes depending on the category of the external control unit. For instance, a push button generates a binary signal having a zero voltage lasting for a time length equal to the time duration while the push button being pushed down; quite different, a voltage divider generates a DC voltage tuned by rotating a rotary knob attached to the voltage divider. The loading and power control unit may be implemented by a microcontroller with program codes designed respectively accommodating to different control signals of different attributes for generating PWM signal to cause $T_{on}$ value variable according to the control signal attribute, such as to carry out illumination level adjustment or setting. The illumination level characteristics including light intensity and color temperature can be thus set by operating the external control unit.

Figure 3A:
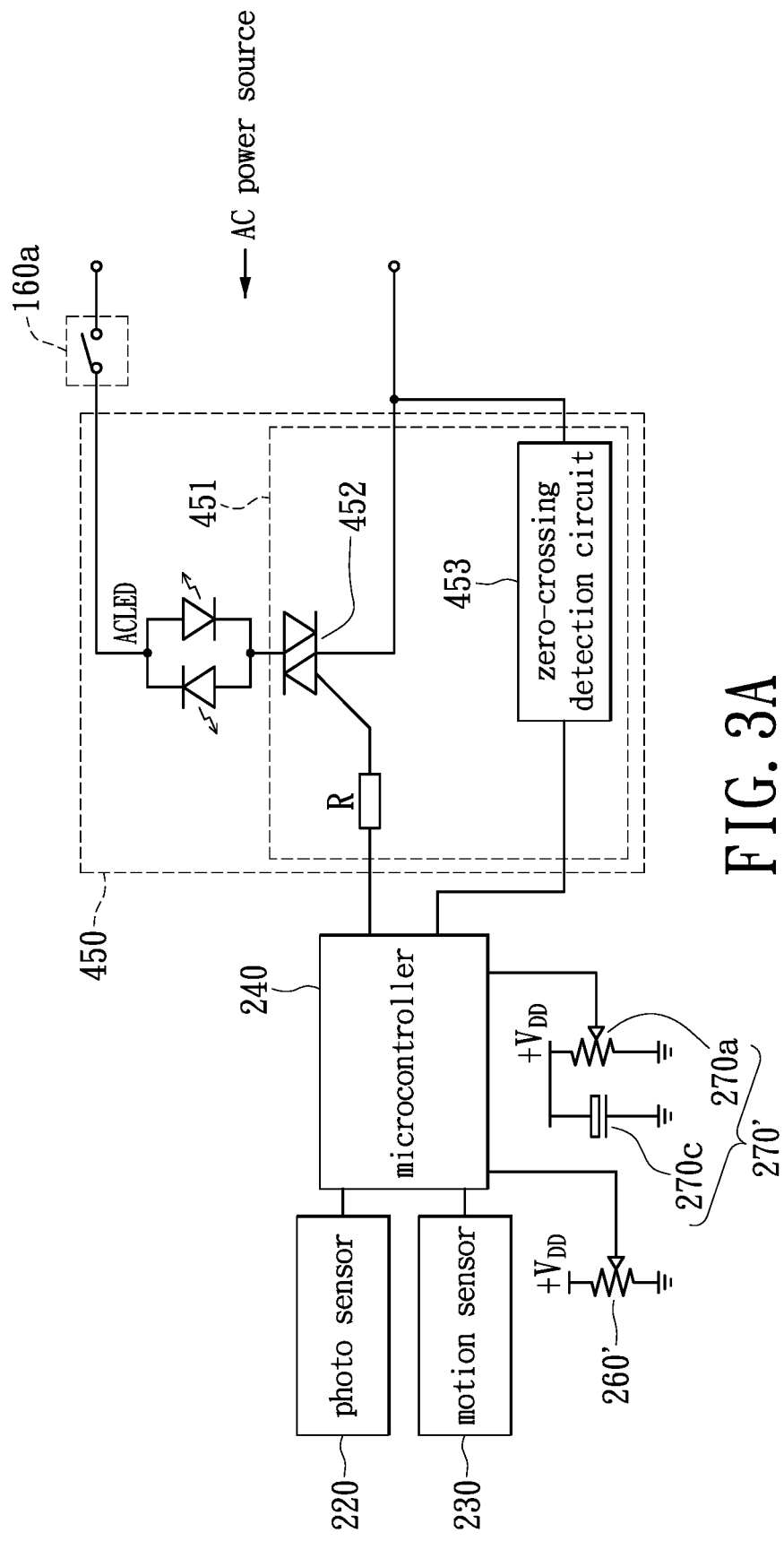
FIG. 3A illustrates a schematic diagram of a LED security light in accordance with the second exemplary embodiment of the present disclosure.
Figure 4:
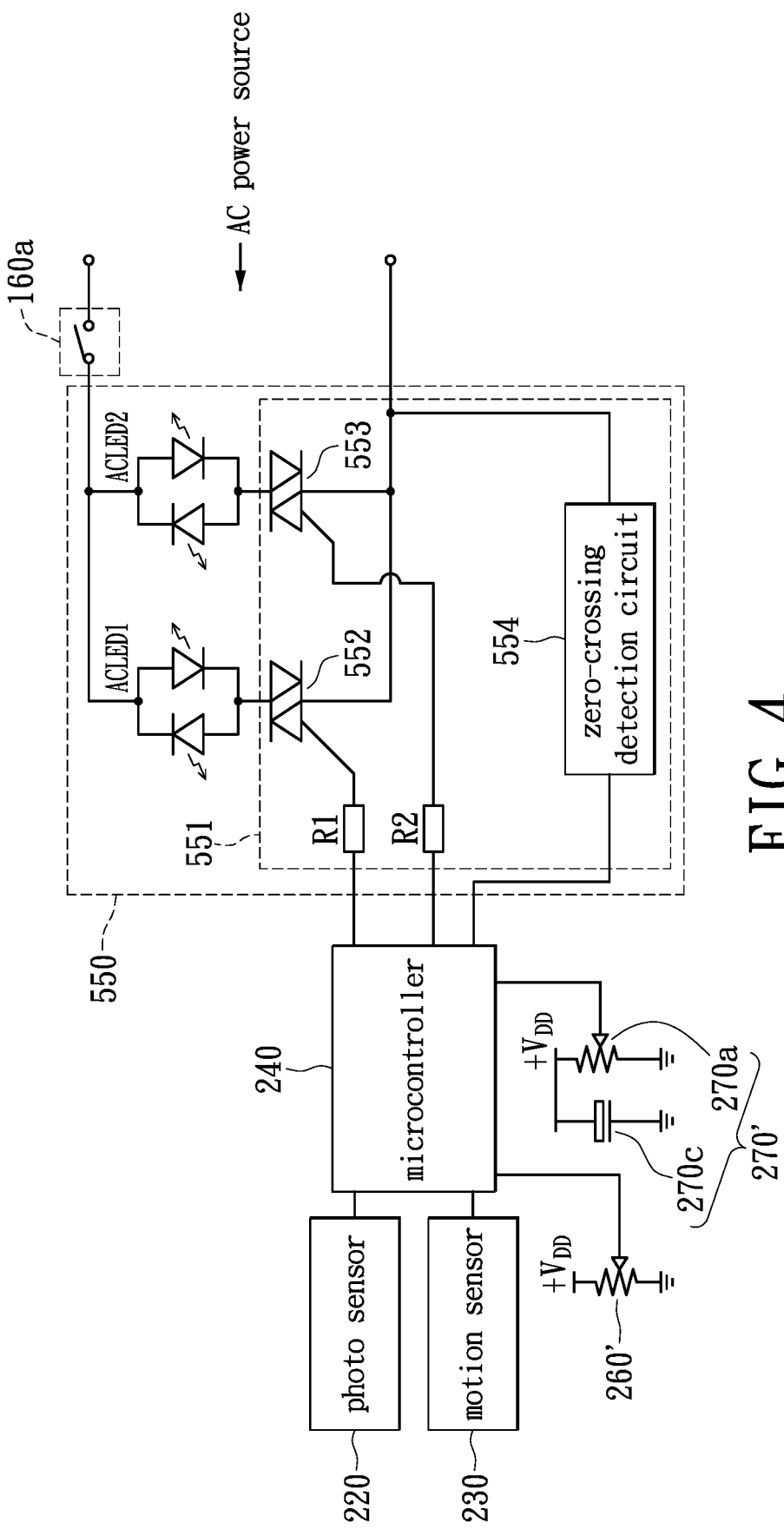
FIG. 4 illustrates a schematic diagram of a LED security light in accordance with the second exemplary embodiment of the present disclosure.

Refer back to FIG. 1, wherein the light emitting unit 150 may include a phase controller and one or more parallel-connected alternating current (AC) LEDs. The phase controller is coupled between the described one or more parallel-connected ACLEDs and AC power source. The loading and power controller 140 in the instant exemplary embodiment may through the phase controller adjust the average power of the light emitting unit 150 so as to generate variations in the first level and the second level illuminations. Refer to FIG. 3A and FIG. 4 in conjunction with FIG. 1, this embodiment provides a two-level security light control device applicable to AC lighting sources, comprising the power supply unit 110, the photo sensor 120 (that is the photo sensor 220), the motion sensor 130 (that is the motion sensor 230), the loading and power control unit 140 (that is the microcontroller 240), a zero-crossing detection circuit 453, a plurality of phase controllers (one phase controller 452 shown in FIG. 3A and one phase controllers 551 shown in FIG. 4 are exemplary illustrated), the time setting unit 160 (that is the variable 260') and the external control unit 270' coupled with the loading and power control unit 240.

Refer to FIG. 3A, which illustrates a schematic diagram of a two-level LED security light 100 in accordance to the second exemplary embodiment of the present disclosure. The operation of the external control 270' can be referred to FIG. 2C and the related description of manual and free-running setting of illumination level, and the earlier description thus the redundant information is not repeated. It is worth mentioning that the power supply detection circuit 270b is implemented by the zero-crossing detection circuit 453, and the power switch mentioned in the previous embodiment can be implemented by the power switch 160a electrically coupled to the AC power source and the zero-crossing detection circuit 453. For a two-level LED security light setting up at the ceiling or a high site far from the user, the free-run setting of the illumination level through instant power interruption by utilizing the power switch 160a is very convenient for the user, in which no any added switching device is needed. The main difference between FIG. 3A and FIG. 2C is in that the light-source load is an ACLED, which is coupled to the AC power source, and further the light emitting unit 450 includes a phase controller 451, for ease of explanation, but the present disclosure is not so restricted. The phase controller 451 is in-series connected to the AC lighting source (ACLED) and the AC power source, wherein the microcontroller 240 is for writing operation program to control a conduction period of the phase controller 451 thereby to adjust the average power of the AC lighting source (ACLED). In another embodiment, a plurality of phase controller 451 can be also controlled by the microcontroller 240. The phase controller 451 includes a bi-directional switching device 452, here, a triac, a zero-crossing detection circuit 453, and a resistor R. The microcontroller 240 turns off the light emitting unit 450 when the photo sensor 220 detects that the ambient light is higher than a predetermined value. Conversely, when the photo sensor 220 detects that the ambient light is lower than the predetermined value, the microcontroller 240 activates the PC mode by turning on the light emitting unit 450. In the PC mode, the microcontroller 240 may select a control pin for outputting a pulse signal which through a resistor R triggers the triac 452 to have a large conduction angle. The large conduction angle configures the light emitting unit 450 to generate a high level illumination for a predetermined duration. Then the microcontroller 240 outputs the pulse signal for PS mode through the same control pin to trigger the triac 452 to have a small conduction angle for switching the light emitting unit 450 from the high level illumination to the low level illumination of the PS mode. Moreover, when the motion sensor 230 (also called motion sensor) detects a human motion in the PS mode, the microcontroller 240 temporarily outputs the PC-mode pulse signal through the same control pin to have the light emitting unit 450 generated the high level illumination for a short predetermined duration. After the short predetermined duration, the light emitting unit 450 returns to the low level illumination.

In the illumination control of the ACLED, the microcontroller 240 may utilize the zero-crossing detection circuit 453 to send an AC synchronized pulse signal thereof which may trigger the triac 452 of the phase controller 451 into conduction at a proper time point thereby to change the average power input to the light emitting unit 450. As the ACLED has a cut-in voltage $V_t$ for start conducting, thus if the pulse signal inaccurately in time triggers the conduction of the triac 452, then the instantaneous value of AC voltage may be lower than the cut-in voltage $V_t$ of ACLED at the trigger pulse. Consequently, the ACLED may result in the phenomenon of either flashing or not turning on. Therefore, the pulse signal generated by the microcontroller 240 must fall in a proper time gap behind the zero-crossing point associated with the AC sinusoidal voltage waveform.

Supposing an AC power source having a voltage amplitude $V_m$ and frequency f, then the zero-crossing time gap $t_D$ of the trigger pulse outputted by the microcontroller 240 should be limited according to $t_o<t_D<\frac{1}{2}f-t_o$ for a light-source load with a cut-in voltage $V_t$, wherein $t_o=(\frac{1}{2}\pi f)\sin^{-1}(V_t/V_m)$. The described criterion is applicable to all types of ACLEDs to assure that the triac 452 can be stably triggered in both positive and negative half cycle of the AC power source. Take ACLED with $V_t(rms)=80V$ as an example, and supposing the $V_m(rms)=110V$ and f=60 Hz, then $t_o=2.2$ ms and $(\frac{1}{2}f)=8.3$ ms may be obtained. Consequently, the proper zero-crossing time gap $t_D$ associated with the phase modulation pulse outputted by the microcontroller 240 which lagged the AC sinusoidal voltage waveform should be designed in the range of 2.2 ms$<t_D<$6.1 ms.

Figure 3B:
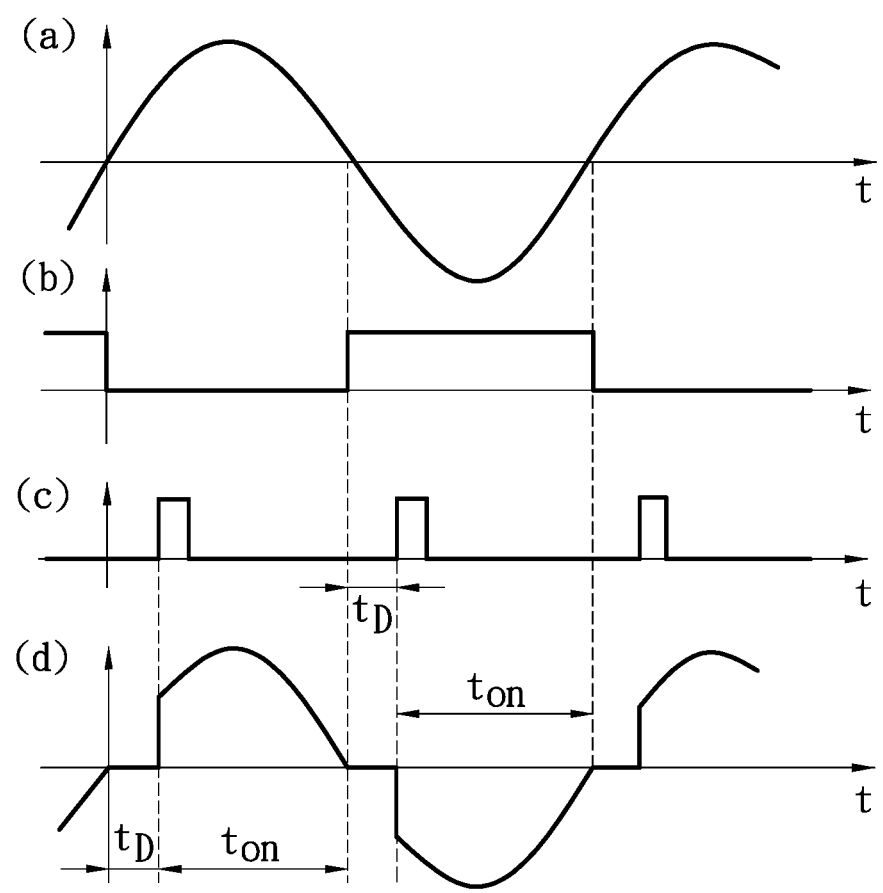
FIG. 3B illustrates a timing waveform of a LED security light in accordance with the second exemplary embodiment of the present disclosure.

Refer to FIG. 3B, which illustrates a timing waveform of the two-level LED security light in accordance to the second exemplary embodiment of the present disclosure. Waveforms (a)~(d) of FIG. 3B respectively represent the AC power source, the output of the zero-crossing detection circuit 453, the zero-crossing delay pulse at the control pin of the microcontroller 240, and the voltage waveform across the two ends of the ACLED in the light emitting unit 450. The zero-crossing detection circuit 453 converts the AC voltage sinusoidal waveform associated with the AC power source to a symmetric square waveform having a low and a high voltage levels as shown in FIG. 3B(b). At the zero-crossing point of the AC voltage sinusoidal wave, the symmetric square waveform may transit either from the low voltage level to the high voltage level or from the high voltage level to the low voltage level. Or equivalently, the edge of the symmetric square waveform in the time domain corresponds to the zero-crossing point of the AC voltage sinusoidal waveform. As shown in FIG. 3B(c), the microcontroller 240 outputs a zero-crossing delay pulse in correspondence to the zero-crossing point of the AC sinusoidal waveform in accordance to the output waveform of the zero-crossing detection circuit 453. The zero-crossing delay pulse is relative to an edge of symmetric square waveform behind a time gap $t_D$ in the time domain. The $t_D$ should fall in a valid range, as described previously, to assure that the triac 452 can be stably triggered thereby to turn on the ACLED. FIG. 3B(d) illustrates a voltage waveform applied across the two ends associated with the ACLED. The illumination level of the light emitting unit 450 is related to the conduction period $t_{on}$ of the ACLED, or equivalently, the length $t_{on}$ is directly proportional to the average power inputted to the ACLED. The difference between the PC mode and the PS mode being that in the PC mode, the ACLED has longer conduction period, thereby generates the high level illumination; whereas in the PS mode, the ACLED conduction period is shorter, hence generates the low level illumination.

Refer to FIG. 3A and FIG. 3B concurrently for setting ACLED illumination level. In manual setting, the microcontroller 240 with program codes controls the conduction time period $t_{on}$ of the ACLED to be in a preset range $0<t_{on}<\frac{1}{4}f-t_0$; wherein by tuning the variable resistor (voltage divider 270a) the light intensity level of the ACLED can be adjusted between zero and 50% of the maximum light intensity. In the free-run setting of illumination level, the microcontroller 240 with program codes controls the conduction time period $t_{on}$ of the ACLED to periodically change in a preset range $0<t_{on}<\frac{1}{4}f-t_0$, such that the ACLED generates illumination gradually and periodically increasing from zero to 50% and then decreasing from 50% to zero of the maximum light intensity. When following the free-run of lighting variation, the illumination level can be set through power interruption momentarily by utilizing the power switch 160a.

Refer to FIG. 4, which illustrates a schematic diagram of a two-level LED security light 100 in accordance to the second exemplary embodiment of the present disclosure. The operation of the external control 270' can be referred to FIG. 2C and the related description of manual and free-running setting of illumination level, and the earlier description thus the redundant information is not repeated. It is worth mentioning that the power supply detection circuit 270b is implemented by the zero-crossing detection circuit 554, and the power switch mentioned in the previous embodiment can be implemented by the power switch 160a electrically coupled to the AC power source and the zero-crossing detection circuit 554. The light emitting unit 550 of the lighting apparatus 100 includes an ACLED1, an ACLED2, and a phase controller 551. The phase controller 551 can be treated as two phase controllers 451 (shown in FIG. 3A) which are parallel-connected. In still another embodiment, a plurality of phase controllers (451 or 551) are respectively series-connected to a plurality of alternating current (AC) lighting sources (ACLED), wherein the pairs of phase controller-AC lighting source are parallel-connected to the AC power source. The phase controller 551 includes triacs 552 and 553, the zero-crossing detection circuit 554 as well as resistors R1 and R2. The light emitting unit 550 of FIG. 4 is different from the light emitting unit 450 of FIG. 3A in that the light emitting unit 550 has more than one ACLEDs and more than one bi-directional switching devices. Furthermore, the color temperatures of the ACLED1 and the ACLED2 may be selected to be different.

In the exemplary embodiment of FIG. 4, the ACLED1 has a high color temperature, and the ACLED2 has a low color temperature. In the PC mode, the microcontroller 240 uses the phase controller 551 to trigger both ACLED1 and ACLED2 to conduct for a long period, thereby to generate the second level illumination as well as illumination of mix color temperature. In the PS mode, the microcontroller 240 uses the phase controller 551 to trigger only the ACLED2 to conduct for a short period, thereby generates the first level illumination as well as illumination of low color temperature. Moreover, in the PS mode, when the motion sensor 230 detects a human motion, the microcontroller 240 may through the phase controller 551 trigger the ACLED1 and the ACLED2 to conduct for a long period. Thereby, it may render the light emitting unit 450 to generate the second level illumination of high color temperature and to produce high contrast in illumination and hue, for a short predetermined duration to warn the intruder. Consequently, the lighting apparatus may generate the first level or the second level illumination of different hue. The rest of operation theories associated with the light emitting unit 550 are essentially the same as the light emitting unit 450 and further descriptions are therefore omitted.

The present disclosures is a continuation of technology enhancement to elaborate operating functions of the external control unit 170 installed with the motion sensing security light 100 of FIG. 1 with a focus on an APP based new remote control technology usable for setting operating parameters of a motion sensing security light 100. The present invention is applicable to a general lighting device, a single level security light, a two level security light or a multi-level/life style security light and the lighting load can be a non-linear lighting load such as LED lamp, a linear load such as halogen lamp or any electrically energize-able light emitting material(s); wherein for single level security light the motion sensor 130 is switched on at dusk by the photo sensor 120 with the light emitting unit 150 remaining off, when a motion intrusion is detected by the motion sensor 130 the light emitting unit 150 is instantly turned on for a short time duration and in the absence of continued motion intrusion(s) detected the light emitting unit 150 is then turned off; wherein for the two level security light the motion sensor 130 is switched on at dusk and at the same time the light emitting unit 150 is turned on to perform a low level illumination mode, when a motion intrusion is detected by the motion sensor 130 the light emitting unit 150 is instantly managed to change from a low level illumination mode to a high level illumination mode for a short time duration before being switched back to the low level illumination mode, the light emitting unit 150 is automatically switched off at dawn by the photo sensor 120; wherein for the multi-level/life style security light the light emitting unit 150 is automatically turned on at dusk to perform a first level illumination mode for a first predetermined duration and then is switched to a low level illumination mode, when a motion intrusion is detected the light emitting unit 150 is instantly managed to perform a high level illumination mode for a second predetermined duration, in the absence of further motion(s) detected, the light emitting unit 150 is then switched back to the low level illumination mode till at dawn the photo sensor 120 manages to turn off the light emitting unit 150 and to disconnect the motion sensor 130.

In general, a security light 100 (as FIG. 1, herein as a lighting apparatus) may include a power supply unit 110, a photo sensor 120, a motion sensor 130, a loading and power control unit 140, a light-emitting unit 150, a time setting unit 160 and an external control unit 170. The loading and power control unit 140 may be implemented by a controller circuitry that includes a programmable device, such as a microcontroller, operating with software codes. In practice, the loading and power control unit 140 performs various operating modes of the security light 100 according to sensing signals received from the photo sensor 120 and the motion sensor 130. The time setting unit 160 and the external control unit 170 are used to adjust or set operating parameters of the loading and power control unit 140 for performing various operating modes. The current state of art provides inconvenient technology, for instance, using many push buttons and rotating knobs, for a user to set or adjust the operating parameters of a security light. It is hence highly recommended to develop user-friendly technology, for instance, wireless remote control technology, to facilitate the settings of a variety operating parameters of the security light 100.

The conventional wireless remote control technology has been in existence and used for operating electrical apparatuses such as TV sets, air-conditioners, ceiling fans integrated with light kits or lighting items for as many years as we could possibly remember. The advantage of using a wireless remote control technology is the convenience of being able to locally control the various operating functions of the electrical apparatuses which are remotely located in high rise location or distant location "without needing to climb a ladder, lean out a window, reach down from roof, or engage in other inconvenient activities". Such advantage of local controllability is essentially the same for all home appliances with remote control devices though each electrical appliance may have some different operating parameters, the fundamental technologies to operate such different performance functions are of no differences.

One application of wireless technology to remotely modify or set operating parameters of a security light system can be found, for example, in U.S. Pat. No. 7,880,394 B2, which discloses an art of "Lighting Control System to Facilitate Remote Modification of A Fixture Modifiable Operating Parameter". The U.S. Pat. No. 7,880,394 B2 uses an external memory connected to a controller to store a database for each category of operating parameters, such that according to wireless instructions the controller performs simply a process of looking up the table, picking the selected datum from the table and executing the selected operating parameter. The options of each operating parameter are limited to the database pre-installed in the external memory.

In view of prevalent usage of mobile devices, such as smart phone, APP based method can be designed for free setting the operating parameters of a security light system, such that a more flexible, more convenient and more cost effective setting technology, other than what disclosed in U.S. Pat. No. 7,880,394 B2, can be provided.

Figure 5:
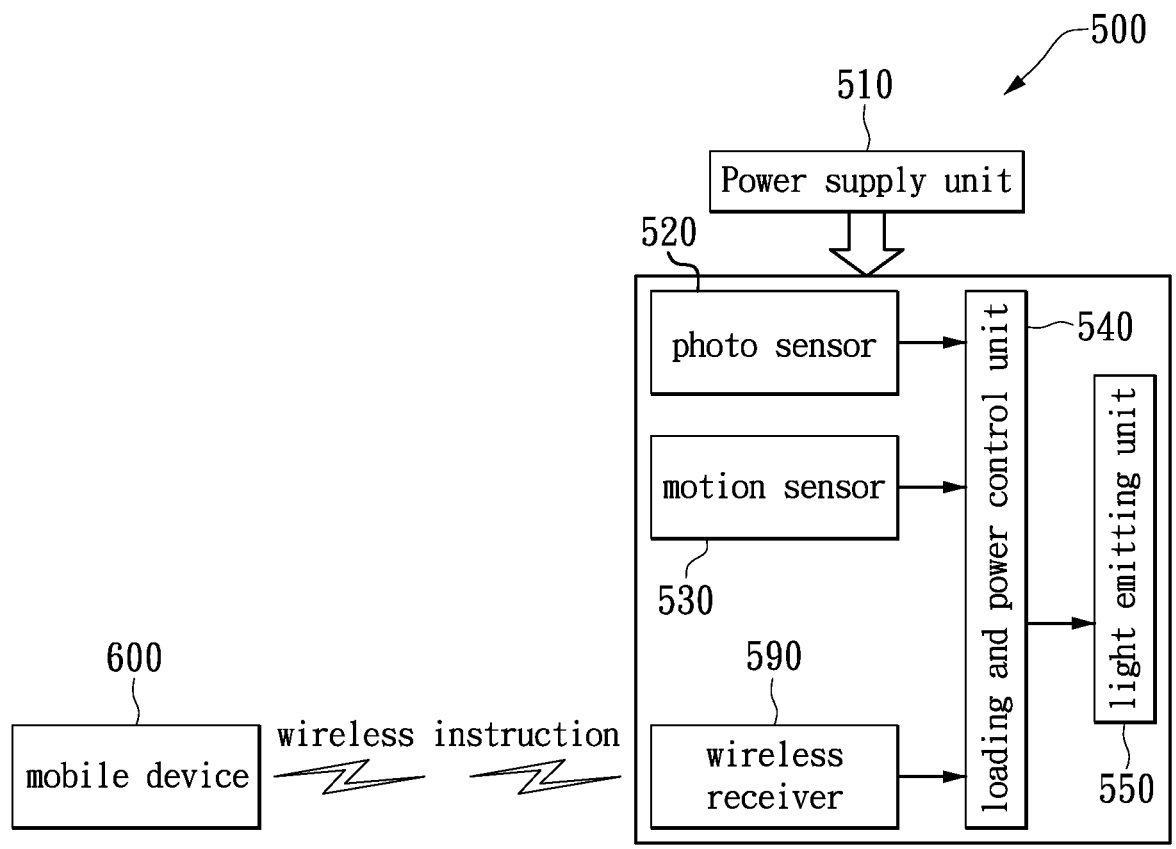
FIG. 5 illustrates a block diagram of a mobile device for wirelessly controlling the security light of the present disclosure.

Referring to FIG. 5 of an exemplary embodiment of the present disclosure, wherein an elaborated security light 500 is provided with a wireless receiver 590 to receive wireless instructions from a mobile device 600 for adjusting and setting various operating functions of the security light 500. The security light 500 has a similar system structure like the structure described in FIG. 1, except the time setting unit 160 and the external control unit 170 are now replaced by the wireless receiver 590, other circuitry components such as the power supply unit 510, the photo sensor 520, the motion sensor 530, the loading and power control unit 540 and the light emitting unit 550 remain unchanged. The wireless receiver 590 is used as a wireless platform for performing various external control functions such that cumbersome work of manual settings on a security light panel can be eliminated. The elaborated security light 500 is featured with a remote setting technology based on the wireless platform of the wireless receiver 590 to work together with an APP software pre-installed in a mobile device 600 to remotely adjust or modify control signal(s) required for performing various operating modes of the security light 500. The mobile device 600 is loaded with an APP (application program) for free setting the operating parameters for the security light 500. The mobile device 600 is implemented by a mobile phone, a pad, a PDA, a notebook or a remote controller. The type of mobile device 600 is not limited thereto. It will be understood that these embodiments are provided by way of example and that other counterpart components may be used as well to effect these teachings.

The present disclosure uses an APP based software technology to operate on line free settings of various operating parameters for a security light 500. The APP based technology enables a user to arbitrarily select "any level" of a relevant operating parameter. The operating parameter for instance can be a value of motion delay time, a value of sensitivity for photo sensor 520 or motion sensor 530, a value of brightness or a mode of many time counting related, light intensity setting related, or distance setting related modes. The operating parameter is in a designated category of operating functions within a maximum circuitry capacity.

The present disclosure discloses an on line free setting method to enable an end user to set "any level" of operating parameter in each functional category, the word "any level" fundamentally precludes the possibility of employing conventional remote control technology which uses the pick and play method to alternately modify up to three level (high, medium and low) of operating parameters for operating the security light, such as disclosed in the prior art U.S. Pat. No. 7,880,394; wherein an external memory 104 is designed to store limited predetermined data for various values of operating parameters and a controller 101 simply follows instruction(s) of the wireless instruction played by a user to look up the table stored in the memory and pick the instructed datum/data for execution. Such technology of pick and play is relatively simple and straight forward.

The present disclosure of on line free setting method on the other hand requires a much more sophisticated technology for implementation because the free setting could lead to a large variation of instructions by the user while it is impossible or at least not cost effective for using a big memory to store a large data base for free selection. One better approach to fulfill a free setting capacity is to use an algorithm to compute user's free setting decisions on an on line basis. In other words, the present disclosure is a compute and play method, and the external memory for operating pick and play method as disclosed in the prior art of U.S. Pat. No. 7,880,394 may be no longer needed.

Figure 6A:
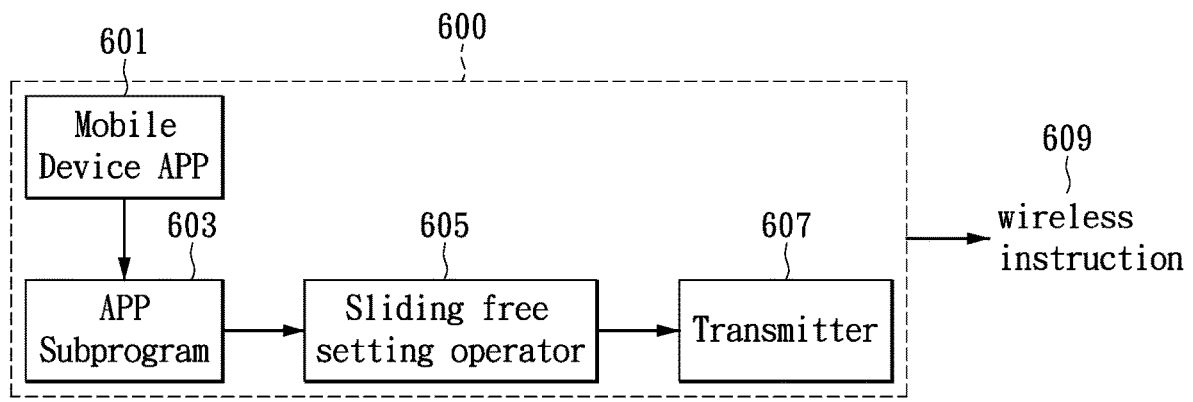
FIG. 6A illustrates a block diagram of the mobile device loaded with an APP software for wirelessly controlling the security light of the present disclosure.

Referring now to FIG. 6A, the mobile device 600 generally comprises a processor, a memory and a transmitter. An APP based free setting algorithm is loaded into the memory. For example, when the user wants to adjust brightness of the security light 500, the user uses the mobile device 600 with APP to transmit wireless instruction 609 by the transmitter 607. The user opens the mobile device APP 601, which is understood as a user interface APP, and selects one of many functional blocks available. The APP selected function block will accordingly call the relevant APP Subprogram 603 to show a free setting algorithm 605 on the screen of the mobile device 600. The free setting algorithm 605 comprises a free setting operator, a virtual track coupled with the free setting operator and an indicator of capacity operating rate to provide instantaneous information of the changing capacity operating rate. The free setting algorithm 605 allows the user to select a capacity operating rate by finger sliding the free setting operator along the virtual track with the help of the indicator of capacity operating rate.

When a desired capacity operating rate of a relevant operating parameter of the security light 500 is determined by the user, the user interface APP 601 with free setting algorithm 605 manages to transmit a wireless instruction signal 609 carrying a message coded with selected capacity operating rate as an operating variable for a relevant operating parameter by transmitter 607 to the security light 500. This transmitter 607 is configured and arranged to selectively transmit the aforementioned instructions for reception by the wireless receiver 590 of the security light 500.

In simple term, the user interface APP 601 loaded in the mobile device 600 transforms a user's setting decision into an operating variable of the operating parameter, wherein the operating variable is the capacity operating rate. The mobile device 600 wirelessly transmits wireless instruction 609 with an operating variable pertaining to a relevant operating parameter to the security light 500. The relevant program loaded in the security light 500 is activated to use the value of the operating variable for computing, adjusting and setting at least one operating parameter of the security light 500. The security light 500 accordingly produces a relevant output based on the selected operating variable(s) of the relevant operating parameter(s).

Figure 6B:
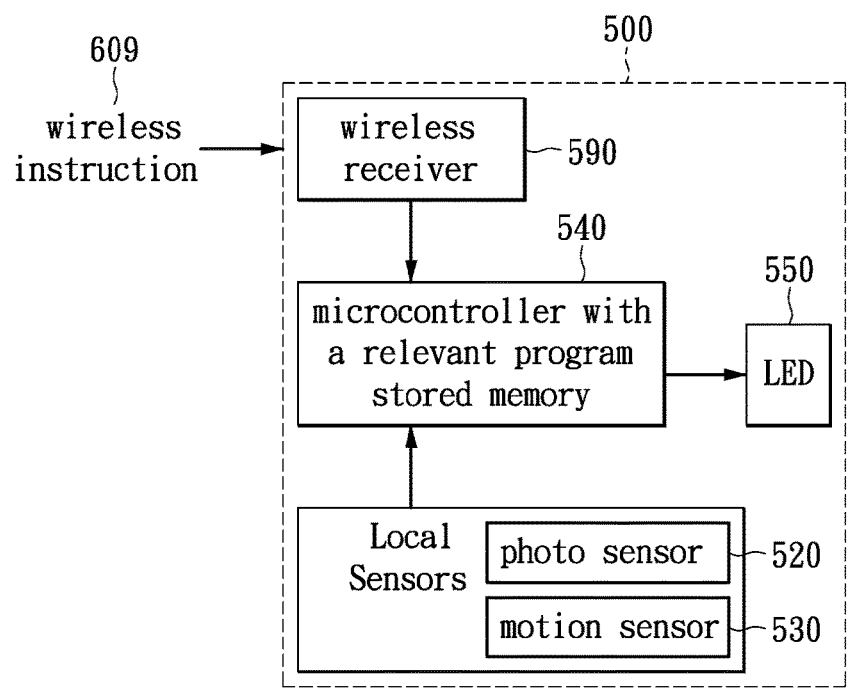
FIG. 6B illustrates a block diagram of the security light for wirelessly receiving instruction from the mobile device loaded an APP software for free setting of operating parameter(s).

Please further refer to FIG. 6B, wherein the security light 500 comprises a wireless receiver 590, a programmable controller circuitry or a microcontroller 540 loaded with at least one relevant program corresponding to a free setting algorithm of the user interface APP 601 loaded in the mobile device 600, a light-emitting unit 550, a photo sensor 520 and a motion sensor 530, wherein when the security light 500 through the wireless receiver 590 receives a wireless instruction 609, a relevant program according to the wireless instruction 609 is activated to perform on line free setting of operating parameter.

The free setting algorithm is a capacity scale simulation designed to enable a user to operate setting of capacity operating rate of an operating parameter of a lighting device or an electrical appliance, such as a ceiling fan with light kit or an air conditioner, on a touch screen of a mobile device. It is a method to simulate a maximum capacity of an operating function of a lighting device or an electrical appliance with a scale arrangement which allows a user to select a capacity operating rate of an operating parameter on a simulator. In the present invention two types of capacity scale simulator are disclosed to implement the free setting algorithm; the first capacity scale simulator is a distance length simulator such as a virtual track coupled with a free setting operator, wherein the capacity operating rate is determined by the parking location of the free setting operator on the virtual track, the second capacity scale simulator is a time length simulator such as a virtual button integrated with a capacity free running subroutine, wherein the capacity operating rate is determined by the time length a user continues to touch the virtual button compared with the time length of a half cycle period of the free running cycle period.

Figure 7:
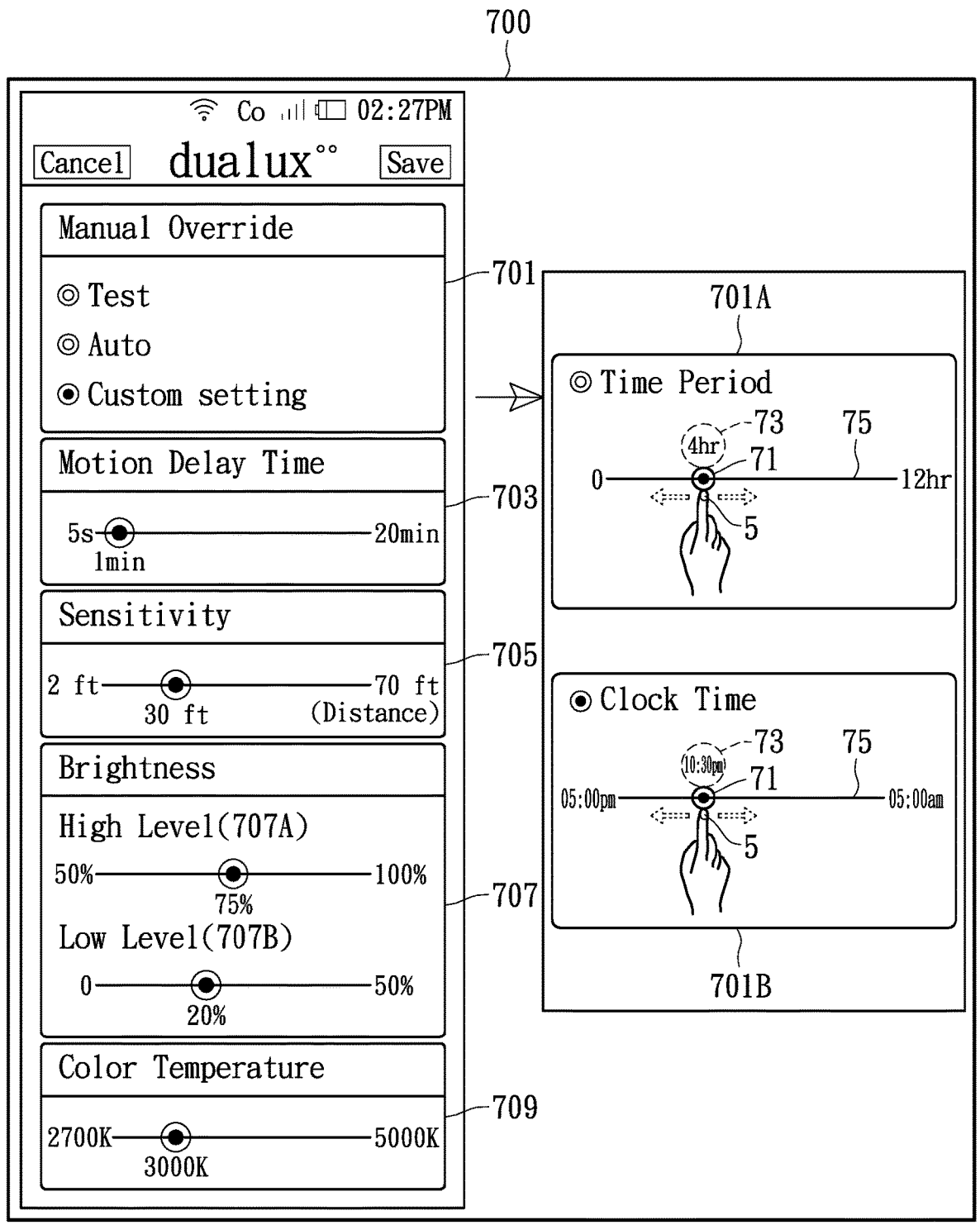
FIG. 7 illustrates a first user interface APP with virtual track configuration designed and loaded in a mobile device for operating free settings of various operating parameters according to the present disclosure.

Please refer to FIG. 7 which is an exemplary embodiment of the present disclosure in accordance with the aforementioned APP based free setting technology. FIG. 7 illustrates an example of a visualized free setting algorithm of the user interface APP 601. The free setting algorithm is implemented by visual elements comprising a group of icons on the display screen of a mobile device when a user interface APP of free setting is initiated. Basically, a security light may be designed to operate a variety illumination modes including manual override 701, motion sensing related settings, such as motion delay time 703 and sensitivity 705, lighting level adjustment 707 and color temperature setting 709. The icons shown in FIG. 7 represent free setting algorithm comprising visual elements like free setting operator 71, virtual track 75 and digital indicator 73, to facilitate a user to set operating parameters of a security light. The display image of FIG. 7 is utilized for convenience to explain the free setting of the present disclosure, but not to limit the present invention. Aside from visualization implementation like FIG. 7, the free setting algorithm may be implemented by acoustic means, for instance, instead of touch visual icons, a type of user interface APP not to be described here may be employed to pick up the user's voice for performing free setting.

Figure 7A:
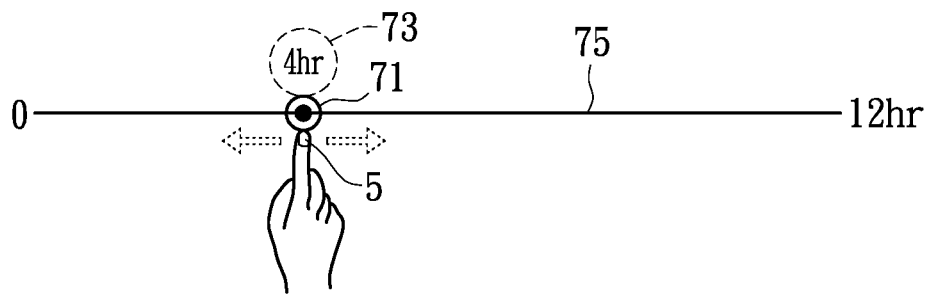
FIGS. 7A, 7B, 7C, 7D, 7E, 7F and 7G illustrate virtual track configuration of the free setting algorithm for free setting various operating parameters of the security light, respectively.
Figure 7B:
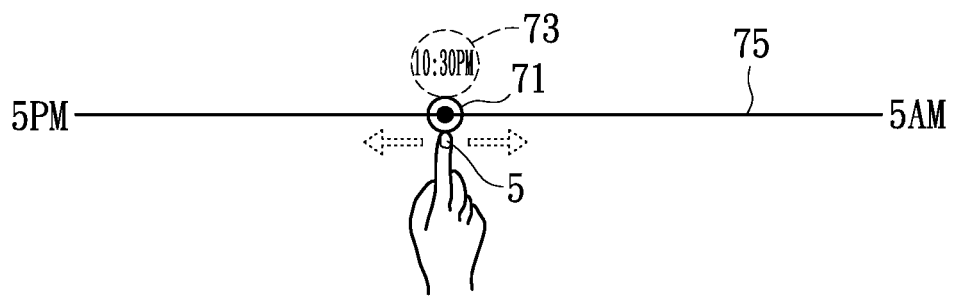

Please refer to the function block 701 of FIG. 7 and in view of FIG. 6A and FIG. 6B, the present invention discloses the manual override setting method with a manual override free setting algorithm. The manual override setting comprises a test mode, an auto mode, and a custom setting mode. When the test mode is operated, the microcontroller 540 operates to activate a subroutine to disable the photo sensor 520 such that the motion sensor 530 is operable during the day time and the user is able to check the functionality of the motion sensor 530 and make setting decisions for each of operating parameters. When the auto mode is operated, the APP operates to activate a subroutine of preset capacity operating rates for all operating parameters programmed in the APP to wirelessly transmit to the security light 500, the microcontroller 540 then operates to compute and adjust relevant control signals to cause the security light 500 to perform each operating parameter according to each preset capacity operating rate R. When the custom setting mode is operated, the APP operates to activate a subroutine to temporarily disable the motion sensor 530 for a programmable timer (sub block 701A) and the user is allowed to slide the free setting operator 71 along the virtual track 75 which serves as a time length counter, the full length of the virtual track 75 is equal to the maximum time length of the programmable timer which could be practically designed at 12 hours. Thus, when a user's finger 5 stops sliding and parks at a location point of ⅓ of the full length of the virtual track 75 for instance, the indicator 73 of the capacity operating rate R simultaneously shows a time period of 4 hours just selected for performing a constant illumination mode counting from the dusk time when the photo sensor 520 automatically turns on the security light 500. Aside from the fixed time period timer (sub block 701A) for performing a general illumination, the custom setting mode further provides a clock time timer free setting option (sub block 701B), wherein the virtual track 75 serves as a clock time scale, wherein when the user's finger 5 is sliding along the virtual track 75, the indicator 73 of the capacity operating rate R synchronously shows the instantaneous clock time for setting reference and the clock time setting is completed and determined at the parking location when the user's finger 5 stops sliding, to operate custom setting clock time free settings the APP can be programmed to convert or transform a clock time setting into an equivalent of time period setting using the clock time reference from the mobile device 600 and wirelessly transmit such converted time period information to the security light 500 for on line execution. For instance, if the user sets 10 pm as the time point to convert the illumination mode from the timer mode to the motion sensing mode at time of 4 pm, the APP calculates to convert the 10 pm clock time to be an equivalent of 10 (pm)–4 (pm)=6 (hours), the APP accordingly transmits an wireless instruction 609 to operate a time delay of 6 hours counting from the setting moment 4 pm, so configured the microcontroller 540 manages to perform time counting from the setting moment 4 pm for 6 hours to switch the security light 500 from the timer mode to the motion sensing mode regardless when the security light 500 is automatically turned on at a dusk time. The transformation work can also be done by the microcontroller 540 in the security light 500 instead of being done by the APP preloaded in the mobile device 600, in such case the APP simply provides clock time input to enable an algorithm in the microcontroller 540 to do the conversion job. Further, please refer to FIG. 7A through FIG. 7G in accompanying FIG. 7 wherein detailed descriptions of free setting parameters will be made. FIG. 7A and FIG. 7B respectively provide schematic illustrations of how free setting is operated with a user interface of the time period free setting algorithm (sub block 701A) and with a user interface of the clock time free setting algorithm (sub block 701B). Shown in FIG. 7A is a time period timer set at 4 hours. Shown in FIG. 7B is a clock time timer set at 10:30 pm.

Figure 7C:

The present disclosure further discloses the motion delay time setting method with a motion delay time free setting algorithm. Please refer to a function block 703 of FIG. 7, when an intrusion motion is detected by the motion sensor 530, the microcontroller 540 manages to instantly turn on the security light 500 or to increase the illumination of the security light 500 from a low level illumination mode to a high level illumination mode to provide a security alert before operating to resume the turned off state or the low level illumination mode. In this embodiment, the virtual track 75 serves as the motion delay time scale with its full length representing the maximum time length of the motion delay time, wherein when a user's finger 5 slides the free setting operator 71 along the virtual track 75, an indicator 73 of the capacity operating rate R synchronously shows the instantaneous value of the motion delay time to help the user make a setting decision. If the maximum time length is designed at 20 minutes, a parking location at 5% of the full length of the virtual track 75 is indicated as 1 minute motion delay time by the indicator 73 of the capacity operating rate R, the microcontroller 540 accordingly manages to multiply the maximum motion delay time control signal S(max) by capacity operating rate R, S (new)=S (max)×R=20 minutes× 5%=1 minute and accordingly operates to perform a motion delay time of 1 minute. FIG. 7C corresponding to functional block 703 is a schematic illustration of how free setting is operated with a user interface of the motion delay time free setting algorithm. Shown in FIG. 7C is a motion delay time set at 1 minute or 5% of the maximum motion delay time.

Figure 7D:
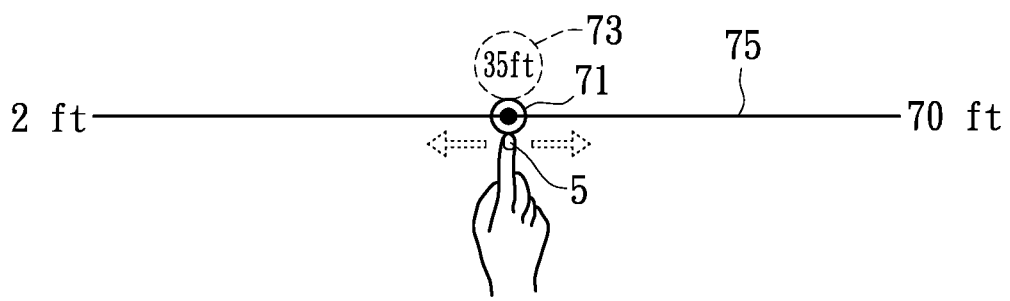

The present disclosure further discloses the detection sensitivity setting method with a detection distance free setting algorithm. Please refer to a function block 705 of FIG. 7, which schematically illustrates the user interface for free setting the operating parameter of detection distance for the motion sensor 530. The full length of the virtual track 75 represents the maximum detection distance, wherein when a user's finger 5 slides the free setting operator 71 along the virtual track 75, an indicator 73 of the capacity operating rate is provided to synchronously show the instant changing value of the detection distance to help the user make a setting decision for a detection distance, if the maximum detection distance for the motion sensing circuitry is designed at 70 feet, when the user stops sliding and parks the free setting indicator 73 at a point equal to 30% of the full length of the virtual track 75, the indicator 73 of the capacity operating rate synchronously shows a detection distance of 70 feet×30%=21 feet is set for performing the detection distance of the motion sensor 530, the APP thereby transmits a wireless instruction 609 of the capacity operating rate valued at 30% to the security light 500, the microcontroller 540 upon receiving the wireless instruction 609 operates to activate a corresponding subroutine to proportionately adjust the voltage signal controlling the amplification of motion sensing signal and therefore the detection distance of the security light 500 is set for 21 ft. FIG. 7D corresponding to the functional block 705 provides a schematic illustration of how free setting is operated with a user interface of the sensitivity distance free setting algorithm. Shown in FIG. 7D is a detection distance set at 21 feet or ⅓ of the maximum detection capacity.

Figure 7E:
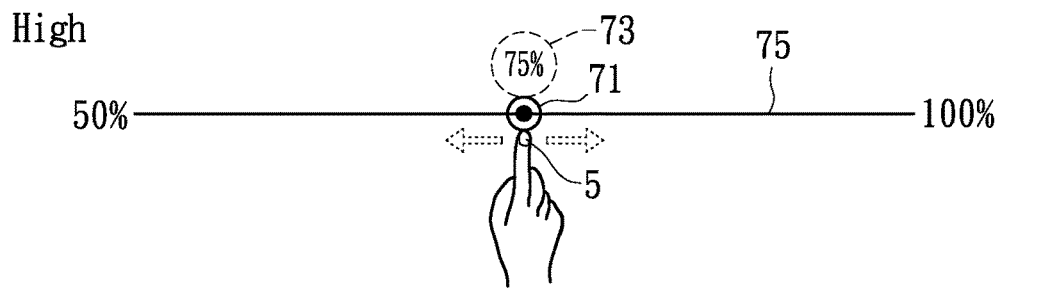
Figure 7E:
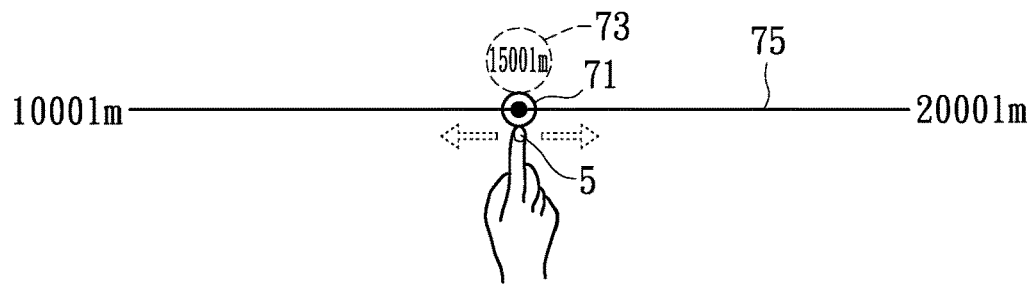
Figure 7F:
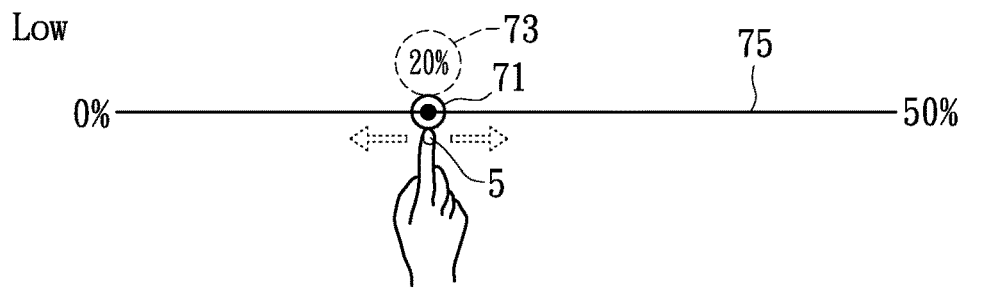
Figure 7F:
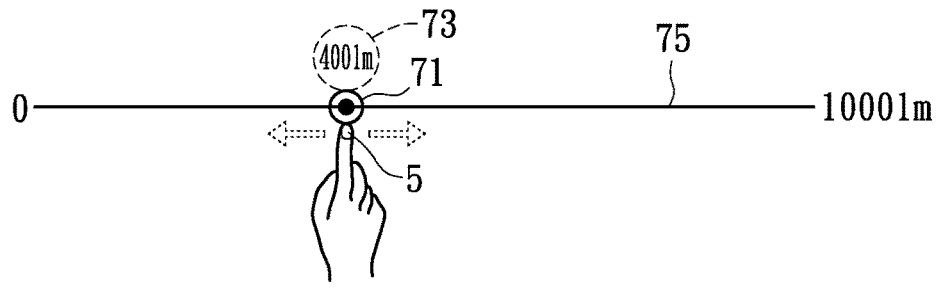
Figure 7G:
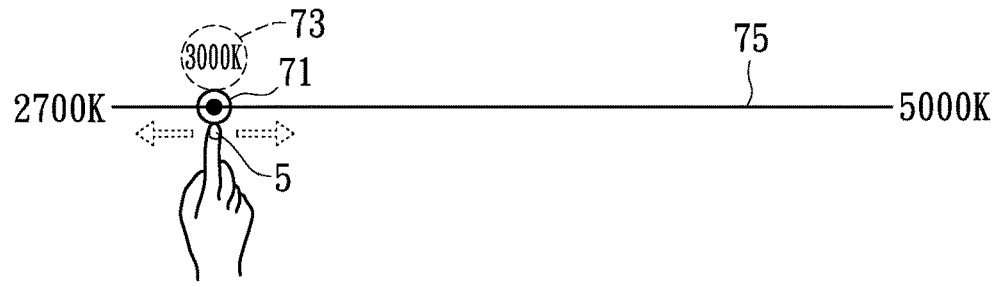

The present disclosure further discloses the brightness setting method with an illumination level free setting algorithm. As shown in a function block 707 of FIG. 7 wherein the brightness free setting algorithm comprises a subroutine 707A for setting high level illumination mode and another subroutine 707B for setting low level illumination mode. In the functional sub block 707A for setting the high level illumination mode, the length of the virtual track 75 represents the adjustable range of brightness level from a minimum starting point of 50% to a maximum ending point of 100% of designed maximum illumination capacity or from the minimum operating value of 1000 lumens to the maximum operating value of 2000 lumens. When a user slides the free setting operator 71 along the virtual track 75 of the capacity operating scale from the minimum starting point to the maximum ending point, the indicator 73 of the capacity operating rate synchronously changes its value from 50% to 100% or from 1000 lumens to 2000 lumens to help the user to make a parking decision based on the instantaneous percentage value or the actual operating value shown in the indicator 73 of the capacity operating rate. In the functional sub block 707B for setting the low level illumination mode, the length of virtual track 75 represents an adjustable range of brightness level from a minimum starting point of 0% to a maximum ending point of 50% of designed maximum capacity. When the user slides the free setting operator 71 along the virtual track 75 from the minimum starting point to the maximum ending point, the indicator 73 of capacitor operating rate synchronously changes the percentage value from 0% to 50% or from 0 lumens to 1000 lumens to help the user to make a parking decision based on the instantaneous operating percentage or actual operating value shown in the indicator 73 of the capacity operating rate. FIG. 7E and FIG. 7F respectively corresponding to sub block 707A and sub block 707B provide schematic illustrations of how free setting is operated with a user interface of the brightness free setting algorithm for the high level illumination mode and for the low level illumination mode. Shown in FIG. 7E is a brightness level set at 75% of the maximum illumination level or 1500 lumens lighting output for the high level illumination mode. Shown in FIG. 7F is a brightness level set at 20% of the maximum illumination capacity or 400 lumens lighting output for the low level illumination mode. FIG. 7G corresponding to the functional block 709 provides a schematic illustration of how free setting is operated with a user interface of the color temperature free setting algorithm. Shown in FIG. 7G is a color temperature set at 3000 K.

So configured with the user interface free setting algorithm, when the user is sliding the free setting operator 71 along the virtual track 75, the instantaneous capacity operating rate will be simultaneously shown in the indicator 73 of the capacity operating rate and thereby the user can instantly make a setting decision according to information provided by the indicator 73 of the capacity operating rate, the numerical information shown in the indicator 73 of the capacity operating rate can either be a percentage of the maximum capacity or an absolute number of operating parameter, for instances, if the operating parameter is for detection distance it is more meaningful to show the detection distance being 21 feet or 35 feet instead of 30% or 50%. Also good are operating parameters having to do with time length such as the motion sensor 530 activated light-on duration or a manual override mode wherein the motion sensor 530 is temporarily disabled for a longer time duration, for these types of operating parameters the user will appreciate more for knowing an absolute number rather than a percentage value. Regardless it can be designed with a program code to alternately change between an operating percentage and an absolute number, the user can simply click or double click the free setting operator 71 to make such switch.

So configured with the interface free setting algorithm, the user is allowed to slide the free setting operator 71 between a minimum starting point and a maximum ending point on the virtual track 75 to decide a parking location for the free setting operator 71 and consequently a capacity operating rate is determined according to the indicator 73 of the capacity operating rate; when a confirmation/save button is pressed, the APP software accordingly manages to send out thru the mobile device 600 a wireless instruction signal 609 carrying a message of the capacity operating rate coded with a pertaining category of operating parameter, via a wireless transmission means (as Wi-Fi, Blue Tooth or RF) of the mobile device 600 to the security light fixture 500. For practical consideration, it could be designed to have the capacity operating rate starting from a minimum value instead of from zero point. For example, the motion delay time needs to have some minimum value such as 5 seconds. Otherwise, the motion sensor 530 would not perform at zero setting which may confuse the user. Same consideration on the detection distance setting that it has to start from some minimum value, such as two feet. Otherwise, the motion sensor 530 would never perform its function at zero setting. This just means that the starting length section from zero to the minimum value is blocked and hidden, it does not change the algorithm of calculating capacity operating rate by using the length P of a parking location measured from the starting zero point divided by the full length of the virtual track 75 "L", namely, R=P/L.

In addition, the contact between the user's finger 5 and the APP touch screen can not be a single point because the finger 5 has its minimum contacting area, it is practically meaningful to configure the length of the virtual track 75 in multiples of a minimum percentage increment. For example, if the minimum percentage increment is set at 5%, it means a total of 20 partition intervals are divided with the abscissa of each partition interval standing for a capacity operating rate of a multiple of 5%. Hence, the track length of the virtual track 75 is progressively built up from 0%, 5%, 10%, . . . , 95%, to 100%. Therefore, when the user's finger 5 slides along the virtual track 75, the capacity operating rate shown in the indicator 73 of capacity operating rate synchronously varies according to a sequence pattern of 0, 5%, . . . , 95%, and 100%. Therefore, when the user parks the free setting operator 71 at a point of the virtual track 75, said parking location falls in a partition interval with a corresponding capacity operating rate equal to some multiple of 5% increment.

The user interface 700 of the APP comprises at least one slidable free setting operator 71 coupled with at least one virtual track 75 and at least an indicator 73 of the capacity operating rate nearby the free setting operator 71 for instantaneous reference. The free setting operator 71 is slidable by the user's finger 5 along the virtual track 75, the virtual track 75 represents a simulation of the circuitry operating capacity of the security light 500 with respect to a category of operating parameter. For instance, if detection distance is referred as the operating parameter, the full length "L" of the virtual track 75 represents the maximum detection distance designed with the circuitry of the security light 500 for operating the detection distance, so configured, the detection distance can be adjusted by sliding the free setting operator 71 along the virtual track 75 from a starting point of minimum value to an ending point of maximum capacity. When the user stops sliding and parks the free setting operator 71, for instance, at a middle point on the virtual track 75. The capacity operating rate indicated is 50% or 35 feet if the maximum detection distance is 70 feet. The capacity operating rate is shown in the indicator 73 of the capacity operating rate designed on a screen location nearby the free setting operator 71 to provide the user with an instantaneous update the value of capacity operating rate while sliding motion is being conducted. The value shown on the indicator 73 of the capacity operating rate can be a relative percentage information or an absolute value information depending on the characteristic of the designated operating parameter(s). The objective of the present disclosure is to help the user to make easy free setting decisions based on the indicated information. The illustrations shown in FIG. 7C and FIG. 7 D are an exemplary embodiment of the present disclosure to provide visual indications of absolute values respectively for motion delay time setting and detection distance setting, such that the user can certainly appreciate the time length information and detection distance information which can help them to make sliding and parking decision.

Corresponding to the free setting algorithm of the mobile device 600 part, the security light 500 part has a relevant software program which is the APP software loaded in the microcontroller 540 of the security light 500 for on line computing designated operating parameter(s) using the input of capacity operating rate R received from the user interface APP of the mobile device 600. A plurality of sub-routines are designed to process corresponding operating parameters. Thus when a wireless instruction 609 generated by the user interface APP by the user is received through the wireless receiver 590, the microcontroller 540 operates to activate a corresponding subroutine to interpret, compute and proportionately adjust the level of a relevant voltage control signal or time length control signal controlling the respective operating parameters of the security light 500 to perform the selected level(s) of the operating parameter(s). The capacity operating rate R is readable and interpretable to the microcontroller 540 for each category of operating parameters. Each subroutine pertaining to a category of operating parameter operates to multiply its maximum capacity value of control signal S(max) which can be a voltage control signal or a time length control signal by the capacity operating rate R to obtain a proportionately adjusted signal strength S (new)=S(max)×(R), the new control signal S(new) thereby operates to change the operating parameter accordingly. For example, if the free setting operator 71 is parked at 60% point on the virtual track 75 for the detection distance category of an operating parameter, the microcontroller 540 accordingly understands the user has set 42 feet (75 feet×60%) to be the detection distance and therefore responsively manage to proportionately adjust a voltage signal controlling the motion sensing circuitry. Please refer to FIG. 8A which schematically illustrates a flow chart for the mobile device part to perform the free setting algorithm of the present disclosure. In step S801, the user requires to open up the user interface APP with on line free setting method designed in a mobile device 600, such as to start the operation of the free setting algorithm. Then, in step S803, the user selects a relevant free setting algorithm designed for setting a specific operating parameter, for instance, selecting one operating parameter of Manual mode, Motion Delay Time, Sensitivity and Brightness. In step S805, the user slides the free setting operator 71 along the virtual track 75 to adjust the operating variable of selected operating parameter. In step S807, the APP operates to compute and convert the user's instantaneous sliding position into the capacity operating rate R, wherein the operating variable is the capacity operating rate R.

In step S809, the user observes the changing instantaneous value of the capacity operating rate R shown in the indicator 73 of the capacity operating rate R. In step S811, the user decides an acceptable capacity operating rate R by parking the free setting operator 71 at the decision moment. In step S813, the user confirms acceptance of the capacity operating rate R by pressing the saving button. Then in step S815, the APP operates to wirelessly transmit wireless instruction 609 with the selected capacity operating rate R to the security light 500. Further refer to FIG. 8B which schematically illustrates the flow chart for the security light 500 part to perform the free setting algorithm of the present disclosure. In step S821, the wireless instruction 609 generated by the user interface APP pre-loaded in the mobile device 600 is received and converted by the wireless receiver 590 of the security light 500 into a message carrying signal(s). Then, in step S823, the microcontroller 540 of the security light 500 reads and interprets the message carrying signal to derive the percentage value of the capacity operating rate R. In step S825, the microcontroller 540 operates to activate a corresponding subroutine of the designated operating parameter. In step S827, the subroutine operates to perform computation of multiplying the stored maximum value of control signal S(max) by the received percentage value R of the capacity operating rate R to obtain a new control signal S(new), namely, S (new)=S(max)×R. In step S829, the microcontroller 540 operates to apply such proportionately adjusted control signal S(new) to operate the relevant performing circuitry, the on line free setting of the operating parameter is thereby completed as step S831.

The user interface APP for free setting operates to transform the user's setting decision into capacity operating rate for wireless transmission to a remotely located security light 500. There may be many methods to configure free setting algorithm of the mobile device. The first method disclosed is a virtual track method as shown in FIG. 7 wherein the user interface APP with free setting algorithm comprises a free setting operator 71, a virtual track 75 coupled with the free setting operator and an indicator 73 of capacity operating rate, wherein the free setting operator 71 is slidable by the user's finger 5 along the virtual track 75 with the indicator 73 of capacity operating rate simultaneously showing an instantaneous value of the capacity operating rate while the sliding motion of the free setting operator is being conducted, wherein the value shown in the indicator 73 can be an operating percentage of the maximum operating capacity of the operating parameter or an actual operating level of the operating parameter, wherein the full length of the virtual track 75 represents a simulation of the maximum operating capacity of the relevant operating parameter characterized by a relevant circuitry, wherein the virtual track 75 is divided into a number of small compartments representing different values of capacity operating rates being lined up according to value sequence to form the full length of the virtual track, wherein capacity operating rate is determined by the parking location of the free setting operator falling in a compartment of the virtual track with a corresponding capacity operating rate when the sliding motion stops, wherein when a parking decision is made, the user may touch or press the "Save" button on the upper right corner of the APP screen and the APP accordingly manages to transmit via the mobile device a wireless instruction signal carrying a message of the selected capacity operating rate to the security light.

Figure 9:
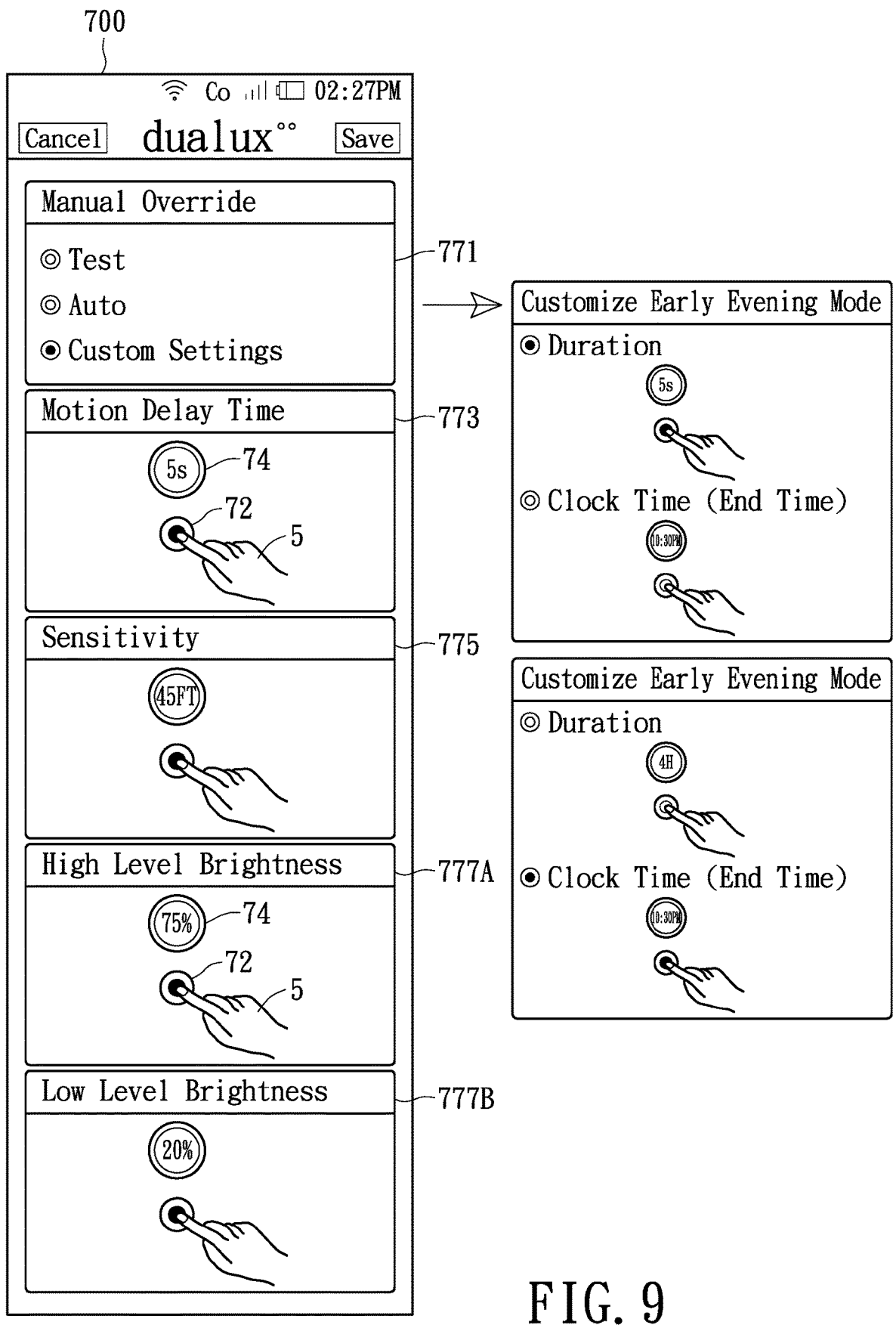
FIG. 9 schematically illustrates a second user interface APP with virtual button configuration designed and loaded in a mobile device operable on the touch screen panel of the mobile device for operating free settings of various operating parameters using free running subroutines to help a user to set various operating parameters.

Aside from the above described virtual track method as a first capacity scale simulator, the present invention also discloses a second capacity scale simulator using a virtual button method. Please refer to FIG. 9 which is a preferred exemplary embodiment of the present disclosure. FIG. 9 is an image of the user interface APP 770 using virtual button method that may be displayed on the screen of a mobile device. The user interface APP 770 may comprise a plurality of free setting algorithms loaded in the mobile device 600 for setting various operating parameters including at least settings of manual override mode 771, setting of motion delay time mode 773, setting of sensitivity 775, setting of high level brightness 777A and setting of low level brightness 777B. Each free setting algorithm for a relevant operating parameter comprises a free setting operator 72, a free running subroutine (not shown) and an indicator 74 of the instantaneous capacity operating rate, wherein the free setting operator 72 is a virtual button designed on the touch screen panel of the mobile device 600. When the virtual button is continuously touched by a finger 5 of the user, the user interface APP operates to activate a free running subroutine to gradually increase the capacity operating rate from a minimum level to a maximum level and then from the maximum level to the minimum level to complete a full cycle of free running motion with a pace which allows the user to observe, determine and take action. During a free running cycle period, the instantaneous value of the changing capacity operating rate is simultaneously shown in the indicator 74 of the capacity operating rate, wherein the value of capacity operating rate can be an operating percentage or an absolute operating value of the operating parameter, wherein the moment at which the user's finger 5 is removed from the virtual button 72, the free running motion is instantly ceased with the capacity operating rate thereby being locked in at the instant level of the last moment of the free running motion. The time length of a half cycle period of the free running motion represents a simulation of the value of the maximum operating capacity of a relevant operating parameter characterized by a relevant circuitry, wherein the time length of each half cycle is divided into a number of time compartments representing different values of capacity operating rates being lined up according to value sequence, wherein the capacity operating rate is determined by the time point when the user's finger is removed from the virtual button, wherein the time point corresponds to a time compartment configured with a capacity operating rate. When a setting decision is made, the user interface APP manages to transmit via the mobile device wireless instruction signals to the security light to set the operating parameter.

Figure 9A:
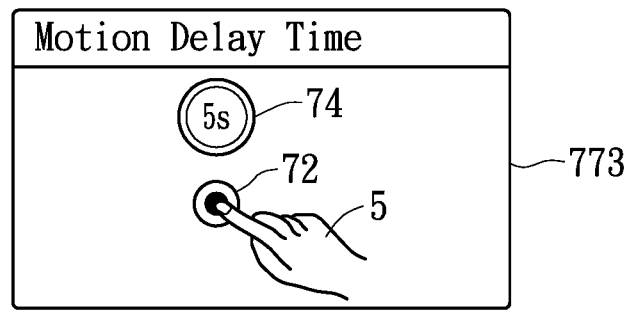
FIG. 9A schematically illustrates the free setting algorithm for selecting a capacity operating rate of motion delay time by continuously pressing a virtual push button and observing the changing value of the indicator.
Figure 9B:
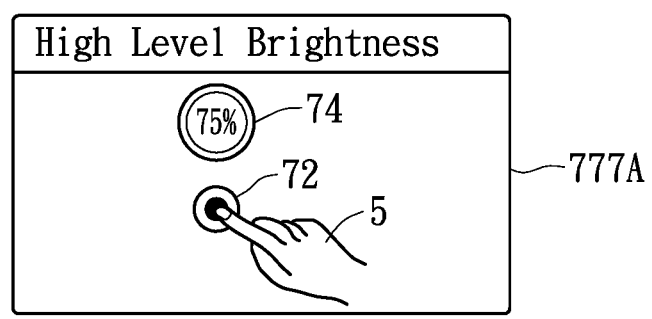
FIG. 9B schematically illustrates an exemplary embodiment of the free setting algorithm for selecting a capacity operating rate of high level brightness by continuously pressing a virtual push button, observing the changing value of the indicator and choosing an instantaneous value shown in the indicator.

Please refer to FIG. 9A and FIG. 9B in view of FIG. 9, which schematically illustrate images of the user interface APP 770 respectively to highlight motion delay time setting 773 and high level brightness setting 777. When the virtual button 72 is continuously touched by a finger 5 of the user, the user interface APP operates to activate a free running subroutine to change cyclically the capacity operating rate from a maximum value to a minimum value, and vice versa, with a pace which allows the user to observe, determine and take action. During a free running cycle period, the instantaneous value of the changing capacity operating rate is simultaneously shown in the indicator 74 of the capacity operating rate, for instance, "5 s" of motion delay time in FIG. 9A and "75%" of high level brightness in FIG. 9B. If the user releases his finger from the virtual button 72 at a time point to select a value, the indicator 74 locks at a value of capacity operating rate that is what the user wishes. When a setting is done, the user may touch or press the "Save" button to transmit via the mobile device wireless instruction signals to the security light to set the relevant operating parameter. Basically, based on the advantage of the free running subroutine, the virtual button method represented by FIG. 9 uses less icons in implementing the free setting algorithm than the virtual track method represented by FIG. 7

Figure 8A:
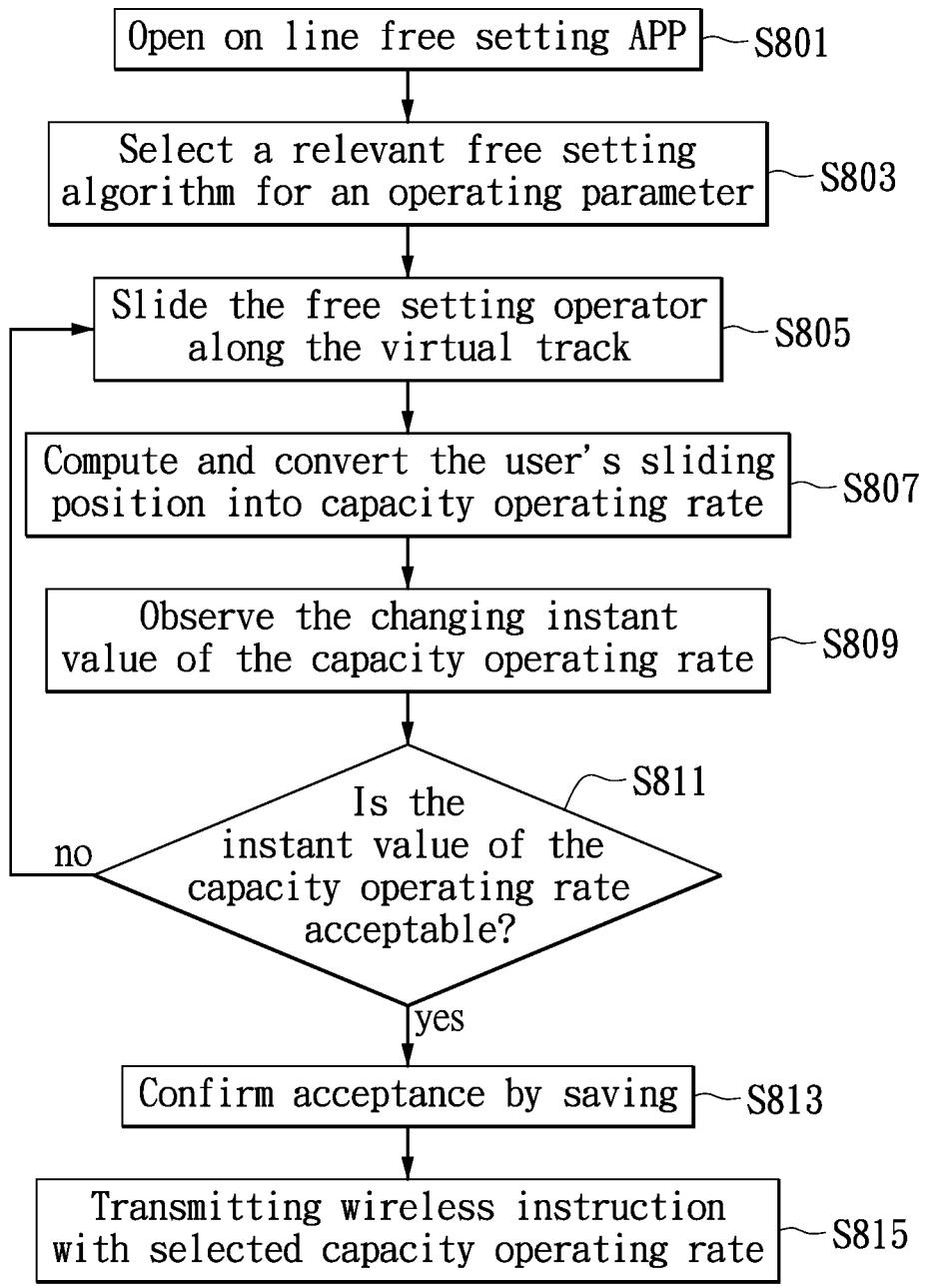
FIG. 8A illustrates a first embodiment of an operating flow chart of the APP based free setting algorithm loaded in a mobile device for operating a free setting operator to slide along the virtual track of a capacity operating scale for selecting and wirelessly transmitting an operating variable.
Figure 8B:
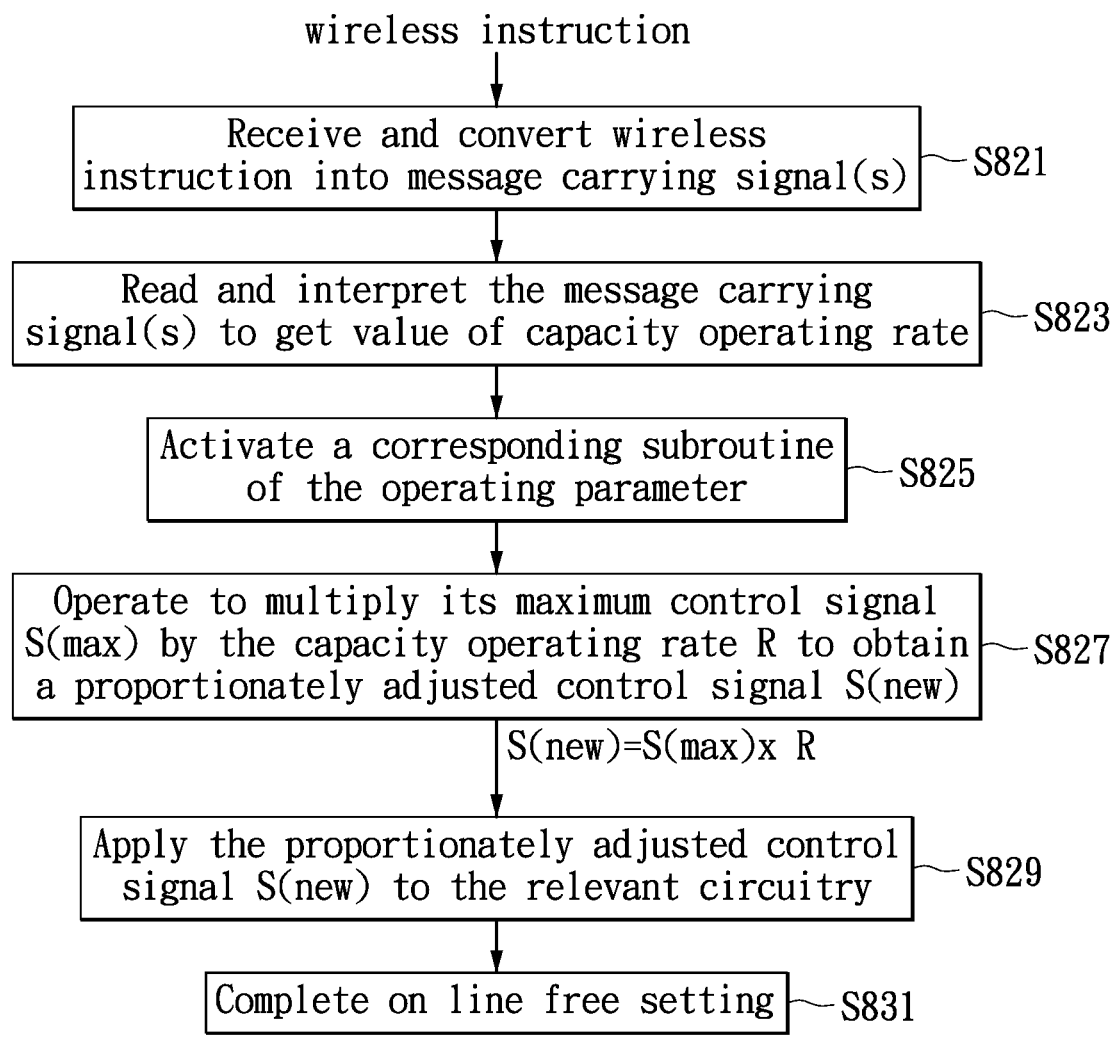
FIG. 8B is the first embodiment of an operating flow chart for receiving wireless instruction of operating variable and activating a relevant subroutine of the APP based free setting algorithm loaded in the security light for processing or computing operating variable(s) received from the mobile device.
Figure 10A:
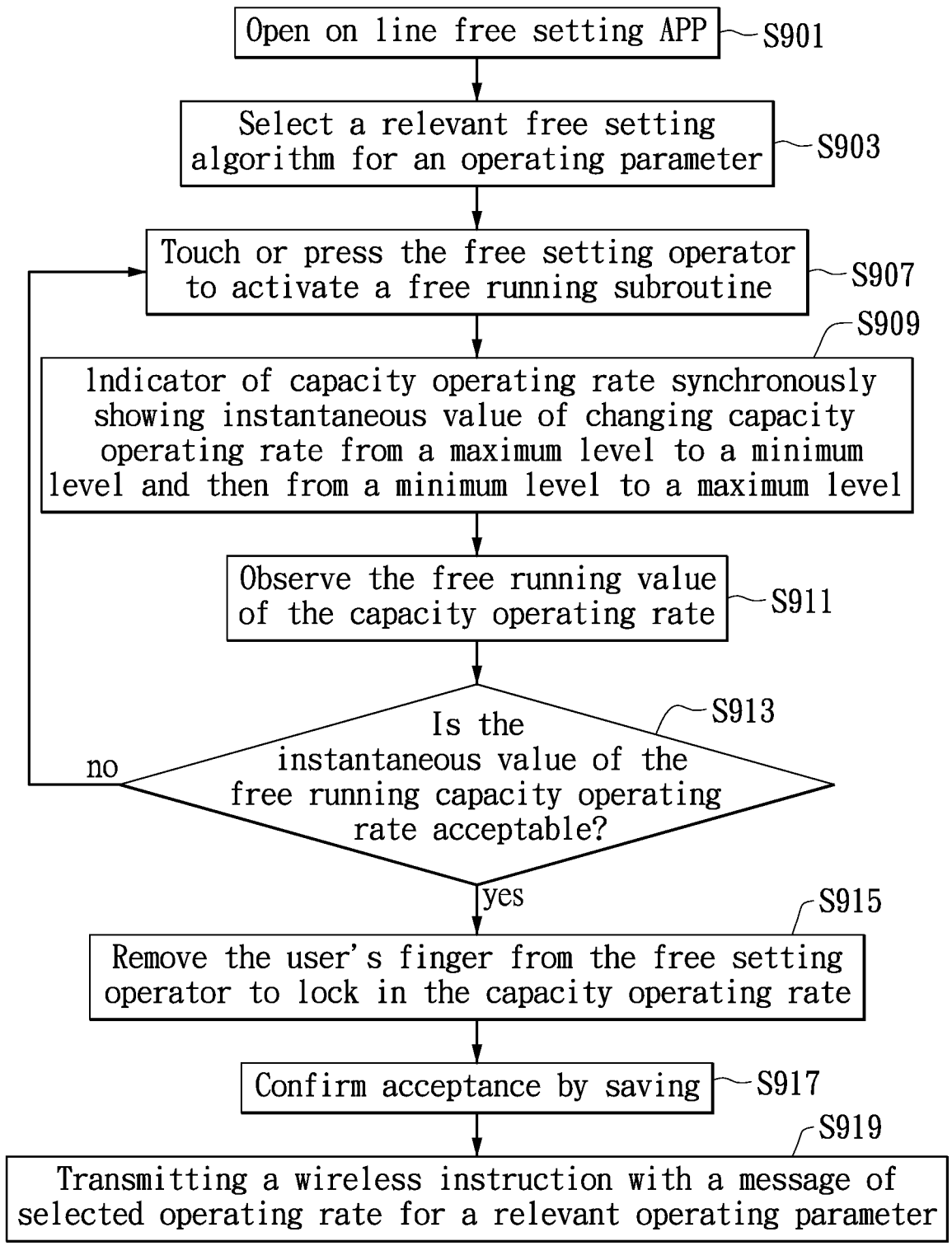
FIG. 10A illustrates a second embodiment of an operating flow chart of an APP based free setting algorithm loaded in a mobile device for operating a free running subroutine to select a desired operating variable by the user.
Figure 10B:
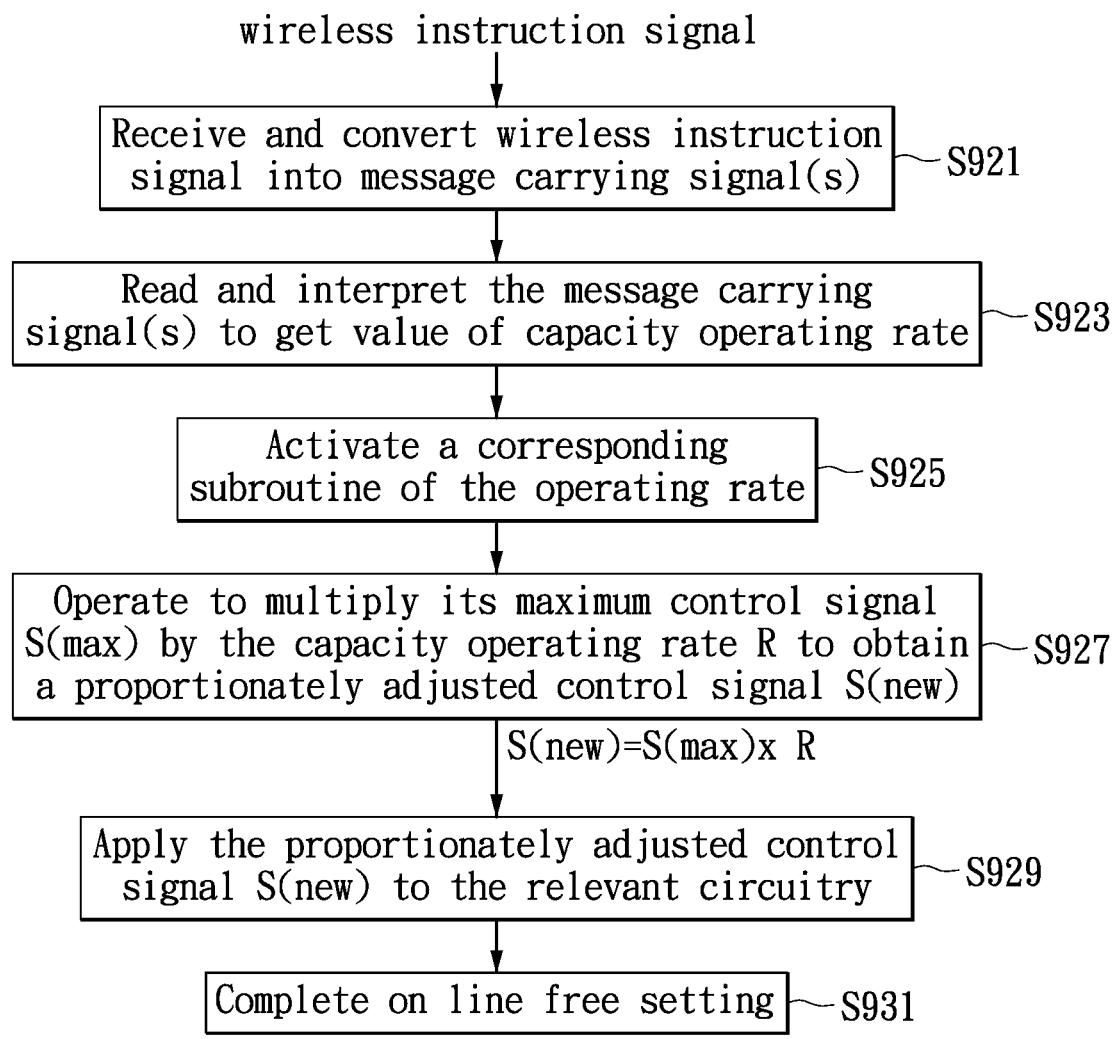
FIG. 10B illustrates the second embodiment of an operating flow chart for receiving wireless instruction of operating variable and activating a relevant subroutine of the APP based free setting algorithm loaded in the security light for processing or computing operating variable(s) received from the mobile device.

FIG. 10A and FIG. 10B as shown are operating flow charts of the on line free setting APP similar to FIG. 8A and FIG. 8B, the only difference between FIG. 8A and FIG. 10A is the implementation method for free setting the capacity operating rate. FIG. 8A illustrates the virtual track method by sliding a free setting operator 71 along a virtual track 75 of a capacity operating scale and with the help of indicator 73 providing the instantaneous value of capacity operating rate while sliding motion is being conducted, the user is able to instantly choose a parking point to determine a desired capacity operating rate. FIG. 10A illustrates the virtual button method by continuously touching a virtual button 72 of a free setting operator to activate a free running subroutine and with the help of indicator 74 providing instantaneous value of changing capacity operating rate the user is able to instantly choose a time point to de-touch the virtual button 72 to lock in a free running capacity operating rate. In other words, the free setting method of FIG. 8A uses a distance length simulation approach to derive the capacity operating rate while the free setting method of FIG. 10A uses a time length simulation approach to derive the capacity operating rate. The instantaneous value of capacity operating rate can either be an operating percentage or an actual operating value; it can be designed such that a simple touch or double touches within a short time interval on the free setting operator can alternatively switch between showing an operating percentage and showing an absolute value of the capacity operating rate. So configured in step 901 the user is required to open On Line Free Setting APP on the touch screen panel of a mobile phone. In Step 903 the user selects a relevant free setting algorithm for an operating parameter. In Step 907 the user touches or presses the free setting operator to activate a free running subroutine. In Step 909, the free running subroutine enables the indicator of capacity operating rate synchronously showing instantaneous value of gradually changing capacity operating rate from a minimum level to a maximum level and then from the maximum level to the minimum level to complete an operating cycle. In Step 911, the user observes the changing free running value of the capacity operating rate. In Step 913, the user decides to select an instantaneous value of the free running capacity operating rate. In Step 915 the user removes his finger from the free setting operator to lock in the instantaneous value of capacity operating rate. In Step 917 the user confirms acceptance of the locked in value of capacity operating rate by pressing the Save button. In Step 919, the APP operates to transmit a wireless instruction with a message of selected operating rate coded with the relevant operating parameter to the security light 500. FIG. 10A as a user interface APP is the first part of the on line free setting APP loaded in a mobile phone operable on the touch screen panel of the mobile phone. FIG. 10B is the second part of the on line free setting APP loaded in the microcontroller of the security light 500 to interpret, compute and set operating parameter(s) according to the wireless instruction(s) received from the mobile phone.

As shown in FIG. 10B, the second part of on line free setting APP starts with Step 921 wherein the receiver of the security light receives and convert wireless instruction signal into message carrying signal(s). In Step 923 the microcontroller reads and interprets the message carrying signal(s)

to obtain value(s) of capacity operating rate(s). In Step 925 the microcontroller accordingly activates a corresponding subroutine for processing the operating rate. In Step 927, the APP operates to multiply its maximum control signal S(max) by the capacity operating rate R to obtain a proportionately adjusted control signal S(new). In Step 929, the microcontroller manages to apply the proportionately adjusted control signal S(new) to the relevant circuitry. In Step 931 the on line setting of a relevant operating parameter is completed.

In summary, the present disclosure of APP based on line free setting method for determining operating parameters of a security light 500 offers users excellent values of convenience, functionality as well as cost savings when compared with the traditional remote control technology in view of the following feature comparisons.

The present disclosure employs a compute and play technology for free setting operating parameters while the traditional remote control uses pick and play method for modifying operating parameter. The pick and play method requires an external memory to store all predetermined values of operating parameters for pick and play by a controller according to the wireless instruction 609. It can only offer a limited selection constrained by the memory capacity and adds cost of installing such memory unit. The present disclosure on the other hand is capable of offering an on line free setting of operating parameter through a computing algorithm. No external memory is used to pre-store a limited database for pick and play performance.

The free setting algorithm is an APP software designed for improving the inconvenience of traditional hardware based remote control technology. Prior art such as U.S. Pat. No. 7,880,394 (the 394 prior art) is a rather old technology compared with the present invention; the 394 prior art was an obvious combination of two existing technologies available at time of patent filing. The two existing technologies including pick and play method and remote control method had been used for a long time in TV program selection, air conditioner control, ceiling fan and light kit control . . . etc. before the filing day of the 394 prior art. The user interface disclosed in the 394 prior art is a relatively old technology, wherein the remote controller comprises a multiple of hardware based push buttons for alternatively setting up to three levels (high, medium and low) of various operating parameters. It simply serves as a medium for transmitting a user's selection decision to the control circuitry of the security light to perform pick and play function to alternatively modify operating pentameters. The user interface of the present invention on the other hand offers more features which are superior to the 394 prior art;

The user interface of the present invention can be free loaded in a mobile phone. This represents a great convenience and cost saving. No extra money is required to spend for furnishing a separate remote controller. The mobile phone has a massive capacity in terms of storage memory and computing power. The external memory used in the 394 prior art is negligible when compared with the massive memory capacity of giga bytes installed in a smart mobile phone which is designed for taking thousands of photographs. A slight allocation of memory capacity of a mobile phone would be more than multiples of the said external memory used in the 394 prior art and there is no extra cost for making use of the mobile phone capacity for controlling the lighting characteristics of the security lights. Additionally, the smart phone is in fact a computer with massive computing and processing power which can be further used to make a connected lighting device become highly intelligent with the help of artificial intelligence and machine learning technologies.

The algorithm of the user interface is designed with user friendly features; unlike the 394 prior art which can only operates high/medium/low options by consecutively pressing a button for a relevant operating parameter, the present invention actually can offer a lot more options of operating parameters with the memory capacity of mobile phone. Furthermore, the indicator is able to provide instantaneous status of changing capacity rate while free setting is in process therefore the user is well aware of what he can choose and thereby making a desired setting decision.

There is no extra operating cost as it becomes an application of the mobile phone. Hassles such as unable to locate the whereabouts of remote controllers and battery run out because of non-frequent use would no longer be a concern as the mobile phone is always in your purse or pocket for any time use and the battery is frequently charged.

The user interface APP pre-loaded in the mobile device enables the lighting fixture to have an access to the use of the massive capacity of storage memory and computing power of the mobile phone. Comparatively the 394 prior art teaching the method of installing an external memory in the lighting fixture for performing pick and play becomes an outdated technique. For using the massive capacity of storage memory and computing power of a smart phone, the job of computing various operating parameters can be done in either the APP of the mobile phone or the program codes written in the microcontroller of the lighting fixture. For computing job done in the mobile phone the operating variables generated are operating parameters while for computing job done in the microcontroller of the lighting fixture the operating variables generated are capacity operating rates. In either case no external memory is required.

The capacity scale simulation disclosed in the present invention is a user friendly technology enabling the user to free set a desired level of operating parameters with the help of capacity operating rate indicator. The 394 prior art simply does not have any user friendly skills comparable to the present disclosure.

In the present disclosure more useful operating functions are designed to fully capitalize the benefit of on line setting method; a good example is the manual override mode, instead of switching to a straight dusk to dawn lighting mode. The present disclosure instead offers an adjustable timer mode, wherein the user is able to set any time duration for operating a general illumination mode with motion sensor 530 being disabled, the user simply slides the free setting operator 71 along the capacity simulation scale of the virtual track 75 to decide the time length wanted for night activity. Additionally, such general illumination mode can be set with clock time point instead of time length, such arrangement is only possible with the mobile device 600 to provide clock time input. Another good example is the illumination level adjustment for various illumination modes activated by either the photo sensor 520 or the motion sensor 530 as different users may have different preferences according to their life styles. The on line free setting method of the present disclosure enables the user's to select any level of lighting brightness by sliding the free setting operator 71 respectively along the capacity simulation scale of the virtual track 75 for the high level illumination mode from 50% to 100% of full brightness and low level illumination mode from 0% to 50%, when the low level is set at 0% the security light 500 is a single level security light, otherwise it is a two level security light or a multilevel/life style security light.

Figure 11:
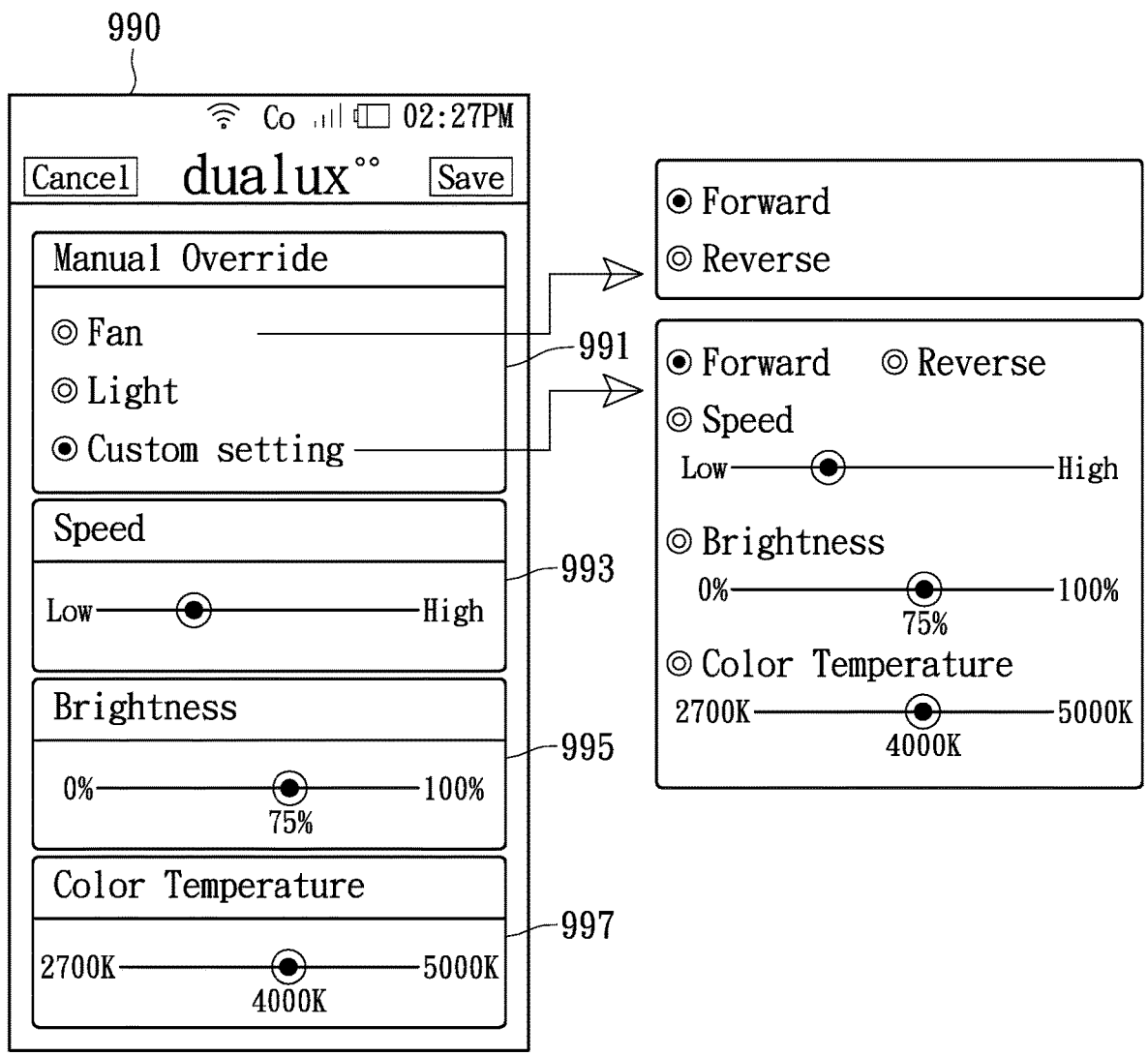
FIG. 11 illustrates another embodiment of the on line free setting algorithms of the present disclosure applied to a ceiling fan with light kit to control fan speed, fan rotation direction, light intensity and light color temperature.

Please refer to FIG. 11 of a preferable exemplary embodiment of the present disclosure. The APP based technology can be further extended to include additional functionality wherein the security light 500 may be integrated with other electric appliances, for instance, with an electric ceiling fan. Probably, a combinatorial system of a security light 500 with a ceiling fan is accomplished by modifying the controller circuitry of the loading and power control unit 540. FIG. 11 illustrates a visualized implementation example of free setting algorithms of a user interface APP for a combinatorial system consisting of security light and ceiling fan wherein visual selection elements representing Fan, Light and Custom setting are designed under the category of Manual Override 991 to offer a user the advantage to select appropriate elements and to on line set operating parameters of both the security light 500 and the ceiling fan. Accordingly, for example, the ceiling fan is controlled to rotate in forward or reverse direction with fan speed adjustable by operating the user interface APP. In simple term, the operating parameter of the present disclosure is used for controlling at least one of various lighting and electrical characteristics of the ceiling fan with light kit including timer settings, fan speed settings and fan rotation direction settings, light intensity settings and light color temperature settings.

The above-mentioned descriptions for various embodiments of free setting algorithm represent merely the exemplary embodiments of the present disclosure without any intention to limit the scope of the present disclosure thereto. Various equivalent changes, alterations or modifications based on the claims of present disclosure are all consequently viewed as being embraced by the scope of the present disclosure.

What is claimed is:

1. An on line free setting method for setting at least one operating parameter of a lighting device, comprising:
    using a user interface APP comprising at least one free setting algorithm preloaded in a mobile device to transform a user's setting decision into at least one operating variable of at least one operating parameter of the lighting device;
    transmitting via the mobile device at least one wireless instruction signal carrying at least one message of the at least one operating variable to the lighting device for processing at least one value of the at least one operating parameter of the lighting device according to the user's setting decision; and
    using a controller of the lighting device, designed with a capacity to interpret the at least one wireless instruction signal received by a wireless signal receiver of the lighting device and accordingly manages to output at least one control signal to control, select or set the at least one value of the at least one operating parameter of the lighting device;
    wherein when the user interface APP is activated and concluded with at least one setting decision, the user interface APP manages to transmit via the mobile device the at least one wireless instruction signal carrying at least one message of the at least one operating variable to the lighting device, wherein the at least one operating variable is used for processing at least one value of the at least one operating parameter of the lighting device;
    wherein the at least one value of the at least one operating parameter is stored in a memory of the controller for a repetitive performance, wherein the at least one value of the at least one operating parameter stored is replaceable by processing a new at least one operating variable selected by the user;
    wherein the at least one operating parameter is used for controlling at least one of various functional performance settings of the lighting device including at least timer setting, light intensity setting, color temperature setting, detection sensitivity setting or performance mode switching and setting between two different illumination performance modes;
    wherein the user interface APP is operable on a touch screen panel of the mobile device, wherein the free setting algorithm is a capacity scale simulation process implemented by a visual configuration of a free setting operator incorporated with a capacity scale simulator and an indicator of a capacity operating rate to facilitate the user's decision making process in setting a desired level of the at least one operating parameter, wherein when the free setting operator is activated by the user to interact with the capacity scale simulator, the user's interface APP responsively manages to determine a value of the capacity operating rate by selection or computation according to an instantaneous state of interaction between the free setting operator and the capacity scale simulator with the indicator of the capacity operating rate simultaneously showing the instantaneous value of the capacity operating rate, wherein the capacity operating rate shown in the indicator can be an operating percentage, an operating chart or an actual operating value of a relevant operating parameter, wherein when a free setting motion of the free setting operator is ceased, the user interface APP manages to generate the at least one operating variable corresponding to the capacity operating rate being determined and accordingly operates to transmit the at least one wireless instruction signal carrying the at least one message of the at least one operating variable to the lighting device for execution.

2. The on line free setting method for setting at least one operating parameter of a lighting device according to claim 1, wherein the capacity scale simulator is a virtual track, wherein the free setting algorithm is implemented by operating the free setting operator to interact with the virtual track and the indicator of the capacity operating rate, wherein the virtual track is designed on the touch screen panel of the mobile device, wherein the free setting operator is slidable by the user's finger along the virtual track with the indicator of the capacity operating rate simultaneously showing an instantaneous value of the changing capacity operating rate while the sliding motion of the free setting operator is being conducted, wherein the value shown in the indicator of the capacity operating rate can be an operating percentage, an operating chart or an actual operating value of the at least one operating parameter, wherein the full length of the virtual track represents a simulation of a value of a maximum operating capacity of the at least one operating parameter, wherein the capacity operating rate is incrementally changed according to a length of the sliding motion and is determined by a final parking location of the free setting operator on the virtual track when the sliding motion stops.

3. The on line free setting method for setting at least one operating parameter of a lighting device according to claim 2, wherein the at least one operating variable is the capacity operating rate of the at least one operating parameter selected by the user, wherein the virtual track is divided into N sensing compartments aligned from one end of the virtual track thru the other end of the virtual track, wherein each sensing compartment of the N sensing compartments is configured with a touch-sensing capacity designed to execute a different capacity operating rate valued incrementally along a sliding direction of the virtual track whenever the sensing compartment is touched during the sliding motion, wherein when the slide motion is ceased and the free setting operator is parked on a sensing compartment on the virtual track, a voltage signal of the at least one operating variable is generated by the user's interface APP representing the user's selection of the capacity operating rate of the at least one operating parameter and simultaneously a selected capacity operating rate is shown in the indicator, the at least one operating variable generated is then transmitted by the mobile device to the lighting device for execution, wherein N is an integer equal to or greater than 2.

4. The on line free setting method for setting at least one operating parameter of a lighting device according to claim 3, wherein the controller of the lighting device is designed to operate a pick and play process for processing the at least one operating variable received thru the wireless signal receiver, wherein for each operating parameter a data base comprising N sets of pre-calculated values of the operating parameter respectively corresponding to N different operating variables are stored in a memory unit accessible to the controller, wherein the controller operates to pick a corresponding value of the at least one operating parameter in the data base according to a value of the at least one operating variable to output at least one control signal to control a switching circuitry to accordingly adjust a functional performance of a lighting characteristic of the lighting device related to the at least one operating parameter.

5. The on line free setting method for setting at least one operating parameter of a lighting device according to claim 2, wherein the at least one operating variable of the at least one operating parameter is the capacity operating rate wirelessly transmitted to the lighting device for computing and setting a relevant operating parameter, wherein the capacity operating rate is determined by measuring a ratio of the length of the parking location on the virtual track from a starting point of the virtual track against the full length of the virtual track, wherein the ratio is further rounded off to the closest integer to become the at least one operating variable for setting the operating parameter selected by the user, wherein the controller of the lighting device is designed with a computing algorithm to convert a value of the at least one operating variable received from the wireless signal receiver to a corresponding value of an operating parameter, wherein the controller outputs at least one control signal to control a switching circuitry to accordingly adjust a functional performance of a lighting characteristic of the lighting device related to the operating parameter according to the value of the operating parameter being produced by the computing algorithm.

6. The on line free setting method for setting at least one operating parameter of a lighting device according to claim 1, wherein the capacity scale simulator is a capacity free running process and the free setting operator is a virtual button, wherein the free setting algorithm is implemented by operating the virtual button to interact with the capacity free running process and the indicator of the capacity operating rate, wherein the virtual button is designed on the touch screen panel of the mobile device, wherein when the virtual button is continuously touched, the user interface APP operates to activate the capacity free running process to gradually increase the capacity operating rate from a minimum level to a maximum level and then from the maximum level to the minimum level to complete a full cycle of a free running motion, wherein during a free running cycle period an instantaneous value of a stepwise changing capacity operating rate is simultaneously shown in the indicator of the capacity operating rate, wherein the value shown in the indicator of capacity operating rate can be the operating percentage, an operating chart or an actual operating value of the at least one operating parameter, wherein at a moment at which the user's finger is removed from the virtual button, the capacity free running motion is instantly ceased with the capacity operating rate thereby being locked in at an instantaneous level of the last step of the free running motion, wherein the time length of a half cycle period of the free running motion represents a simulation of a value of a maximum operating capacity of the at least one operating parameter, wherein the capacity operating rate is determined by the time length the user's finger staying in touch screen panel with the virtual button during each half cycle period of the free running motion.

7. The on line free setting method for setting at least one operating parameter of a lighting device according to claim 6, wherein the at least one operating variable of the at least one operating parameter is the capacity operating rate wirelessly transmitted to the lighting device for controlling and setting a relevant operating parameter, wherein the capacity operating rate is determined by measuring a ratio of the time length of the virtual button being continuously touched by the user's finger in each half cycle period against the time length of the half cycle period of the free running motion, wherein the ratio is further rounded off to the closest integer to become the at least one operating variable for setting the at least one operating parameter selected by the user.

8. The on line free setting method for setting at least one operating parameter of a lighting device according to claim 6, wherein each half cycle period of the free running motion is divided into N sections of time domains with each of the N sections of time domains being assigned a value of the capacity operating rate in an increasing pattern during a first half cycle period of a free running cycle period and in a decreasing pattern during a second half cycle period of the free running cycle period, wherein at a moment when the free running motion arrives at a time domain assigned with a corresponding value of the capacity operating rate and the user's finger is removed from the virtual button, the free running motion is instantly ceased and the capacity operating rate is thereby locked in at the value pertaining to the time domain, the user's interface APP accordingly operates to wirelessly transmit the value of the capacity operating rate thru the mobile device to the lighting device for execution, wherein N is an integer equal to or greater than 2.

9. The on line free setting method for setting at least one operating parameter of a lighting device according to claim 8, wherein the controller of the lighting device is designed to operate a pick and play process for processing the at least one operating variable received thru the wireless signal receiver, wherein for each the at least one operating parameter a data base comprising N sets of pre-calculated values of the at least one operating parameter respectively corresponding to N different operating variables are stored in a memory unit accessible to the controller, wherein the controller operates to pick a corresponding value of the at least one operating parameter in the data base according to a value of the at least one operating variable to output at least one control signal to control a switching circuitry to accordingly adjust a functional performance of a lighting characteristic of the lighting device related to the at least one operating parameter.

10. The on line free setting method for setting at least one operating parameter of a lighting device according to claim 1, wherein the mobile device is a mobile phone, a pad, a PDA, a notebook, a smart watch, a smart speaker or a remote controller featured with a capacity to download an APP from an Internet or a cloud server for controlling and setting the at least one operating parameter of the lighting device.

11. The on line free setting method for setting at least one operating parameter of a lighting device according to claim 10, wherein the free setting algorithm of the user interface APP is a voice recognition software preloaded in the smart speaker from the internet or the cloud server to transform a voice instruction of the user's setting decision into the at least one operating variable of the at least one operating parameter of the lighting device and convert the at least one operating variable into the at least one wireless instruction signal for transmitting to the wireless external control signal receiver of the lighting device.

12. An LED security light, comprising:
a light emitting unit comprising at least a first LED lighting load emitting light with a first color temperature;
a loading and power control unit;
a photo sensor;
a motion sensor;
a power supply unit; and
an external control unit, electrically coupled with the loading and power control unit;
wherein the loading and power control unit comprises a controller and a switching circuitry, wherein the controller is electrically coupled with the photo sensor, the motion sensor and the switching circuitry;
wherein the switching circuitry is electrically coupled between a power source of the power supply unit and the light emitting unit;
wherein the power source is a DC power source;
wherein the switching circuitry comprises at least a first unidirectional semiconductor switching device;
wherein the controller outputs control signals to control the switching circuitry for delivering different electric powers to the light emitting unit such that the light emitting unit respectively generates illuminations of different light intensities for performing different illumination modes activated by the photo sensor, the motion sensor and/or the external control unit;
wherein at dusk when an ambient light detected by the photo sensor is lower than a first predetermined value, the loading and power control unit operates to turn on the light emitting unit to perform a low level illumination mode emitting a light with a low light intensity;
wherein when a motion signal is detected by the motion sensor, the loading and power control unit operates to increase the electric power delivered to the light emitting unit to perform a high level illumination mode emitting the light with a high light intensity for a preset time period before being switched back to the low level illumination mode;
wherein at dawn when the ambient light detected by the photo sensor is higher than a second predetermined value, the light emitting unit is switched off by the loading and power control unit;
wherein the external control unit is a wireless external control signal receiver electrically coupled with the controller to receive, decode and convert at least one wireless instruction signal into at least one value of at least one operating variable interpretable to the controller, wherein the controller is programmed with an APP for the LED security light for processing the at least one value of the at least one operating variable for setting the at least one operating parameter according to the at least one operating variable received from the wireless external control signal receiver, wherein the at least one operating variable represents a setting decision by a user for choosing at least one capacity operating rate for operating at least one functional performance of the at least one operating parameter of the LED security light set by the user thru a mobile device, wherein the at least one operating parameter is used for controlling at least one of functional performance settings of the LED security light including timer setting, light intensity setting, color temperature setting, detection sensitivity setting or performance mode switching and setting between two different illumination performance modes featured with different light intensities and different light color temperatures.

13. The LED security light according to claim 12, wherein the LED security light is designed with an on line free setting method for setting at least one operating parameter of the LED security light, comprising:
a user interface APP comprising at least one free setting algorithm preloaded in the mobile device to transform at least one user's setting decision into at least one operating variable;
wherein when the user interface APP is activated and concluded with the at least one user's setting decision, the user interface APP manages to transmit via the mobile device at least one wireless instruction signal carrying at least one message of the at least one operating variable to the LED security light, wherein the at least one operating variable is used for processing or setting the at least one operating parameter of the LED security light.

14. The LED security light according to claim 13, wherein the user interface APP is operable on a touch screen panel of the mobile device, wherein the free setting algorithm is a capacity scale simulation process implemented by a visual configuration of a free setting operator incorporated with a capacitor scale simulator and an indicator of the capacity operating rate to facilitate making the at least one user's setting decision in setting at least one desired level of the at least one operating parameter, wherein when the free setting operator is activated by the user to interact with the capacity scale simulator, the user interface APP responsively manages to gradually adjust a value of the capacity operating rate according to an instantaneous state of interaction between the free setting operator and the capacity scale simulator with the indicator of the capacity operating rate simultaneously showing the instantaneous state of the capacity operating rate, wherein the capacity operating rate shown in the indicator can be an operating percentage, an operating chart or an actual operating value of a relevant operating parameter, wherein when a free setting motion of the free setting operator is ceased with at least one setting decision, the user interface APP manages to generate the at least one operating variable corresponding to a selection of the at least one capacity operating rate and accordingly operates to transmit the at least one wireless instruction signal carrying a message of the operating variable to the LED security light for setting the relevant operating parameter.

15. The LED security light according to claim 14, wherein the capacity scale simulator is a virtual track, wherein the free setting algorithm is implemented by operating the free setting operator to interact with the virtual track and the indicator of the capacity operating rate, wherein the free setting operator is slidable by the user's finger along the virtual track with the indicator of the capacity operating rate simultaneously showing instantaneous state of a changing capacity operating rate while the sliding motion of the free setting operator is being conducted, wherein the state shown in the indicator of the capacity operating rate can be an operating percentage, an operating chart or an actual operating value of the at least one operating parameter, wherein the full length of the virtual track represents a simulation of the value of the maximum operating capacity of the at least one operating parameter, wherein the capacity operating rate is determined by a parking location of the free setting operator on the virtual track when the sliding motion stops.

16. The LED security light according to claim 14, wherein the capacity scale simulator is a capacity free running process and the free setting operator is a virtual button, wherein the free setting algorithm is implemented by the virtual button, the capacity free running process interacting with the virtual button and the indicator of the capacity operating rate, wherein the virtual button is designed on the touch screen panel of the mobile device, wherein when the virtual button is continuously touched by a user's finger, the user interface APP operates to activate the capacity free running process to gradually increase the capacity operating rate from a minimum level to a maximum level and then from the maximum level to the minimum level to complete a full cycle of free running motion, wherein during a free running cycle period the instantaneous state of a stepwise changing capacity operating rate is simultaneously shown in the indicator of the capacity operating rate, wherein the state of the capacity operating rate can be an operating percentage, an operating chart or an actual operating value of the at least one operating parameter, wherein at a moment when the user's finger is removed from the virtual button, the free running motion is instantly ceased with the capacity operating rate thereby being locked in at an instantaneous level of the last step of the free running motion, wherein the time length of a half cycle period of the free running motion represents a simulation of the value of the maximum operating capacity of the at least one operating parameter wherein the capacity operating rate is determined by the time length the user's finger staying in touch screen panel with the virtual button compared with the time length of a half cycle period of the free running motion.

17. The LED security light according to claim 14, wherein the mobile device is a mobile phone, a pad, a PDA, a notebook, a smart watch, a smart speaker or a remote controller, featured with a capacity to download the user interface APP from an Internet or a cloud server for controlling and setting the at least one operating parameter of the LED security light.

18. The LED security light according to claim 17, wherein the free setting algorithm of the user interface APP is a voice recognition software preloaded in the smart speaker from the internet or the cloud server to transform a voice instruction of the user's setting decision into at least one operating variable of the at least one operating parameter of the LED security light and convert the at least one operating variable into the at least one wireless instruction signal for transmitting to the wireless external control signal receiver of the LED security light.

19. The LED security light according to claim 12, wherein the wireless receiver is a Wi-Fi wireless external control signal receiver, a Blue Tooth wireless receiver, a Zig Bee wireless receiver or a RF wireless receiver.

20. The LED security light according to claim 12, wherein the at least one operating parameter is for setting a timer for performing a manual override illumination mode, wherein the security light is controlled by the photo sensor and the timer for performing a general illumination mode with the motion sensor being temporarily disabled.

21. The LED security light according to claim 20, wherein the timer is a time length setting timer or a clock time setting timer.

22. The LED security light according to claim 12, wherein the at least one operating parameter is for setting the preset time period for performing the high level illumination mode.

23. The LED security light according to claim 12, wherein the at least one operating parameter is for setting the detection distance of the motion sensor.

24. The LED security light according to claim 12, wherein the at least one operating parameter is for setting the light intensity of the low level illumination mode or the high level illumination mode.

25. The LED security light according to claim 12, wherein the at least one operating parameter is for setting a color temperature of the low level illumination mode or the color temperature of the high level illumination mode; wherein the light emitting unit is composed of the first LED lighting load emitting light with the first color temperature and a second LED lighting load emitting light with a second color temperature, wherein the second color temperature is higher than the first color temperature, wherein the first LED lighting load and the second LED lighting load are electrically connected in parallel covered by a light diffuser to create an effect of a mingled light color temperature; wherein the switching circuitry comprises the first unidirectional semiconductor switching device and a second unidirectional semiconductor switching device respectively connected to the first LED lighting load and the second LED lighting load, wherein the controller in response to an instructional signal of the at least one operating variable received from the wireless external control signal receiver operates to activate a color temperature tuning process to respectively control different conduction rates between the first semiconductor switching device and the second semiconductor switching device to manage electric powers respectively allocated to the first LED lighting load and the second LED lighting load for tuning the mingled light color temperature, wherein for performing a power allocation between the first LED lighting load and the second LED lighting load the conduction rate of the first unidirectional semiconductor switching device and the conduction rate of the second unidirectional semiconductor switching device are reversely and complimentarily adjusted such that a total electric power delivered to the light emitting unit remains essentially unchanged.

26. An LED security light, comprising:
  a light emitting unit comprising at least a first LED lighting load emitting light with a first color temperature;
  a loading and power control unit;
  a photo sensor;
  a motion sensor;
  a power supply unit; and
  an external control unit, electrically coupled with the loading and power control unit;
  wherein the loading and power control unit comprises a controller and a switching circuitry, wherein the controller is electrically coupled with the photo sensor, the motion sensor and the switching circuitry;

wherein the switching circuitry is electrically coupled between a power source of the power supply unit and the light emitting unit, wherein the power source is a DC power source;

wherein the switching circuitry comprises at least a first unidirectional semiconductor switching device;

wherein the controller outputs control signals to control the switching circuitry for delivering different electric powers to the light emitting unit such that the light emitting unit respectively generates illuminations of different light intensities for performing different illumination modes activated by the photo sensor, the motion sensor and/or the external control unit;

wherein at dusk when an ambient light detected by the photo sensor is lower than a first predetermined value, the loading and power control unit operates to activate the motion sensor with the light emitting unit in a turned off state;

wherein when a motion signal is detected by the motion sensor, the loading and power control unit operates to deliver an electric power to the light emitting unit to perform a high level illumination mode emitting the light with a high light intensity for a preset time period before being switched back to the turned off state;

wherein at dawn when the ambient light detected by the photo sensor is higher than a second predetermined value, the light emitting unit is switched off by the loading and power control unit;

wherein the external control unit is a wireless external control signal receiver electrically coupled with the controller to receive, decode and convert at least one wireless instruction signal into at least one value of at least one operating variable interpretable to the controller, wherein the controller is programmed with an APP for the LED security light for processing the at least one value of the at least one operating variable for setting at least one operating parameter, wherein the at least one operating variable represents a setting decision by a user for choosing at least one capacity operating rate for operating at least one functional performance of the at least one operating parameter of the LED security light set by the user through a mobile device, wherein the at least one operating parameter is used for controlling at least one of functional performance settings of the LED security light including timer setting, light intensity setting, color temperature setting, detection sensitivity setting or performance mode switching and setting between two different illumination performance modes featured with different light intensities and light color temperatures.

27. The LED security light according to claim 26, further comprising:

a user interface APP comprising at least one free setting algorithm preloaded in the mobile device to transform at least one user's setting decision into the at least one operating variable;

wherein when the user interface APP is activated and concluded with the at least one user's setting decision, the user interface APP manages to transmit via the mobile device at least one wireless instruction signal carrying the least one message of the at least one operating variable to the LED security light, wherein the at least one operating variable is used for processing or setting the at least one operating parameter of the LED security light.

28. The LED security light according to claim 27, wherein the user interface APP is operable on a touch screen panel of the mobile device, wherein the free setting algorithm is a capacity scale simulation process implemented by a visual configuration of a free setting operator incorporated with a capacitor scale simulator and an indicator of the capacity operating rate to facilitate making the at least one user's setting decision in setting at least one desired level of the at least one operating parameter, wherein when the free setting operator is activated by the user to interact with the capacity scale simulator, the user interface APP responsively manages to gradually adjust a value of the capacity operating rate according to an instantaneous state of interaction between the free setting operator and the capacity scale simulator with the indicator of the capacity operating rate simultaneously showing the instantaneous state of the capacity operating rate, wherein the capacity operating rate shown in the indicator can be an operating percentage, an operating chart or an actual operating value of a relevant operating parameter, wherein when a free setting motion of the free setting operator is ceased with at least one setting decision, the user interface APP manages to generate the at least one operating variable corresponding to a selection of the at least one capacity operating rate and accordingly operates to transmit at least one wireless instruction signal carrying at least one message of the at least one operating variable to the LED security light for setting the relevant operating parameter.

29. The LED security light according to claim 28, wherein the capacity scale simulator is a virtual track, wherein the free setting algorithm is implemented by operating the free setting operator to interact with the virtual track and the indicator of the capacity operating rate, wherein the free setting operator is slidable by the user's finger or a touch pen along the virtual track with the indicator of the capacity operating rate simultaneously showing instantaneous state of a changing capacity operating rate while the sliding motion of the free setting operator is being conducted, wherein the state shown in the indicator of the capacity operating rate can be the operating percentage, the operating chart or the actual operating value of the at least one operating parameter, wherein the full length of the virtual track represents a simulation of the value of the maximum operating capacity of the at least one operating parameter, wherein the capacity operating rate is determined by a parking location of the free setting operator on the virtual track when the sliding motion stops.

30. The LED security light according to claim 28, wherein the capacity scale simulator is a capacity free running process and the free setting operator is a virtual button, wherein the free setting algorithm is implemented by the virtual button, the capacity free running process interacting with the virtual button and an indicator of the capacity operating rate, wherein the virtual button is designed on the touch screen panel of the mobile device, wherein when the virtual button is continuously touched by a user's finger or a touch pen, the user interface APP operates to activate the capacity free running process to gradually increase the capacity operating rate from a minimum level to a maximum level and then from the maximum level to the minimum level to complete a full cycle of free running motion, wherein during a free running cycle period the instantaneous state of a stepwise changing capacity operating rate is simultaneously shown in the indicator of the capacity operating rate, wherein the state of the capacity operating rate can be the operating percentage, the operating chart or the actual operating value of at least one the operating parameter, wherein the moment at which the user's finger or the touch pen is removed from the virtual button, the free running motion is instantly ceased with the capacity operating rate thereby being locked in at the instantaneous level of the last step of the free running motion, wherein the time length of a half cycle period of the free running motion represents a simulation of the value of the maximum operating capacity of the operating parameter wherein the capacity operating rate is determined by the time length of the user's finger or the touch pen staying in touch screen panel with the virtual button compared with the time length of a half cycle period of the free running motion.

31. The LED security light according to claim 26, wherein the wireless receiver is a Wi-Fi wireless external control signal receiver, a Blue Tooth wireless receiver, a Zig Bee wireless receiver or a RF wireless receiver.

32. The LED security light according to claim 26, wherein the at least one operating parameter is for setting a timer for performing a manual override illumination mode, wherein the security light is controlled by the photo sensor and the timer for performing a general illumination mode with the motion sensor being temporarily disabled before switching to perform a motion sensing illumination mode.

33. The LED security light according to claim 32, wherein the timer is a time length setting timer or a clock time setting timer.

34. The LED security light according to claim 26, wherein the at least one operating parameter is for setting the preset time period for performing the high level illumination mode.

35. The LED security light according to claim 26, wherein the at least one operating parameter is for setting the detection distance of the motion sensor.

36. The LED security light according to claim 26, wherein the at least one operating parameter is for setting the light intensity of the high level illumination mode.

37. The LED security light according to claim 26, wherein the at least one operating parameter is for setting a color temperature of the high level illumination mode; wherein the light emitting unit is composed of the first LED lighting load emitting light with the first color temperature and a second LED lighting load emitting light with a second color temperature, wherein the second color temperature is higher than the first color temperature, wherein the first LED lighting load and the second LED lighting load are electrically connected in parallel covered by a light diffuser to create an effect of a mingled light color temperature; wherein the switching circuitry comprises the first unidirectional semiconductor switching device and a second unidirectional semiconductor switching device respectively connected to the first LED lighting load and the second LED lighting load, wherein the controller in response to the at least one wireless instructional signal of the at least one operating variable received from the wireless external control signal receiver operates to activate a color temperature tuning process to respectively control different conduction rates between the first semiconductor switching device and the second semiconductor switching device to manage electric powers respectively allocated to the first LED lighting load and the second LED lighting load for tuning the mingled light color temperature, wherein for performing a power allocation between the first LED lighting load and the second LED lighting load the conduction rate of the first unidirectional semiconductor switching device and the conduction rate of the second unidirectional semiconductor switching device are reversely and complimentarily adjusted such that a total electric power delivered to the light emitting unit remains essentially unchanged.

38. The LED security light according to claim 26, wherein the mobile device is a mobile phone, a pad, a PDA, a notebook, a smart watch, a smart speaker or a remote controller, featured with a capacity to download the user interface APP from an Internet or a cloud server for controlling and setting the at least one operating parameter of the LED security light.

39. The LED security light according to claim 38, wherein the free setting algorithm of the user interface APP is a voice recognition software preloaded in the smart speaker from the internet or the cloud server to transform a voice instruction of the user's setting decision into at least one operating variable of the at least one operating parameter of the LED security light and convert the at least one operating variable into the at least one wireless instruction signal for transmitting to the wireless external control signal receiver of the LED security light.

40. An LED security light, comprising:
a light emitting unit, comprising at least a first LED lighting load emitting light with a first color temperature;
a loading and power control unit;
a photo sensor;
a power supply unit; and
an external control unit, electrically coupled with the loading and power control unit;
wherein the loading and power control unit comprises a controller and a switching circuitry, wherein the controller is electrically coupled with the photo sensor and the switching circuitry; wherein the switching circuitry comprises at least a first unidirectional semiconductor switching device; wherein the switching circuitry is electrically connected between a power source of the power supply unit and the at least one lighting load, wherein the power source is a DC power source, wherein the controller outputs control signals to control the switching circuitry for delivering different electric power(s) to the light emitting unit for performing different illumination modes with different light intensities according to control signal(s) received from the photo sensor and the external control unit;
wherein when an ambient light detected by the photo sensor is lower than a first predetermined value, the light emitting unit is thereby turned on by the loading and power control unit to generate an illumination;
wherein when the ambient light detected by the photo sensor is higher than a second predetermined value, the lighting load is thereby turned off by the loading and power control unit;
wherein the external control unit is a wireless external control signal receiver electrically coupled with the controller to receive, decode and convert at least one wireless instruction signal into at least one value of at least one operating variable interpretable to the controller, wherein the controller is programmed with an APP for the LED security light for processing the at least one value of the at least one operating variable for setting at least one operating parameter according to the at least one operating variable received from the wireless external control signal receiver, wherein the at least one operating variable represents a setting decision by a user for choosing at least one capacity operating rate for operating at least one functional performance of the at least one operating parameter of the LED security light set by the user through a mobile device, wherein the at least one operating parameter is used for controlling at least one of functional performance settings of the LED security light including a timer setting, a light intensity setting and/or a color temperature setting.

41. The LED security light according to claim 40, wherein the wireless receiver is a Wi-Fi wireless external control signal receiver, a Blue Tooth wireless receiver, a Zig Bee wireless receiver or a RF wireless receiver.

42. The LED security light according to claim 40, wherein the at least one operating parameter is for controlling the time length of the illumination activated by the photo sensor.

43. The LED security light according to claim 40, wherein the at least one operating parameter is for setting the light intensity of the illumination activated by the photo sensor.

44. The LED security light according to claim 40, wherein the at least one operating parameter is for setting a color temperature of the illumination activated by the photo sensor; wherein the light emitting unit is composed of the first LED lighting load emitting light with the first color temperature and a second LED lighting load emitting light with a second color temperature, wherein the second color temperature is higher than the first color temperature, wherein the first LED lighting load and the second LED lighting load are electrically connected in parallel covered by a light diffuser to create an effect of a mingled light color temperature; wherein the switching circuitry comprises the first unidirectional semiconductor switching device and a second unidirectional semiconductor switching device respectively connected to the first LED lighting load and the second LED lighting load, wherein the controller in response to the at least one wireless instructional signal of the at least one operating variable received from the wireless external control signal receiver operates to activate a color temperature tuning process to respectively control different conduction rates between the first unidirectional semiconductor switching device and the second unidirectional semiconductor switching device to manage electric powers respectively allocated to the first LED lighting load and the second LED lighting load for tuning the mingled light color temperature, wherein for performing a power allocation between the first LED lighting load and the second LED lighting load the conduction rate of the first unidirectional semiconductor switching device and the conduction rate of the second unidirectional semiconductor switching device are reversely and complimentarily adjusted such that a total electric power delivered to the light emitting unit remains essentially unchanged.

45. The LED security light according to claim 40, further comprising:
a user interface APP comprising at least one free setting algorithm preloaded in the mobile device to transform at least one user's setting decision into at least one operating variable;
wherein when the user interface APP is activated and concluded with the at least one user's setting decision, the user interface APP manages to transmit via the mobile device at least one wireless instruction signal carrying at least one message of the at least one operating variable to the LED security light, wherein the at least one operating variable is used for processing or setting the at least one operating parameter of the LED security light.

46. The LED security light according to claim 45, wherein the user interface APP is operable on a touch screen panel of the mobile device, wherein the free setting algorithm is a capacity scale simulation process implemented by a visual configuration of a free setting operator incorporated with a capacity scale simulator and an indicator of capacity operating rate to facilitate making the at least one user's setting decision in setting at least one desired level of the at least one operating parameter, wherein when the free setting operator is activated by the user to interact with the capacity scale simulator, the user interface APP responsively manages to gradually adjust the value of the capacity operating rate according to an instantaneous state of interaction between the free setting operator and the capacity scale simulator with the indicator of the capacity operating rate simultaneously showing the instantaneous state of the capacity operating rate, wherein the capacity operating rate shown in the indicator can be an operating percentage, an operating chart or an actual operating value of the at least one operating parameter, wherein when a free setting motion of the free setting operator is ceased, the user interface APP manages to generate the at least one operating variable corresponding to a selection of the at least one capacity operating rate and accordingly operates to transmit at least one wireless instruction signal carrying at least one message of the at least one operating variable to the LED security light.

47. The LED security light according to claim 46, wherein the capacity scale simulator is a virtual track, wherein the free setting algorithm is implemented by the visual configuration of the free setting operator, the virtual track coupled with the free setting operator and the indicator of the capacity operating rate, wherein the free setting operator is slidable by the user's finger or a touch pen along the virtual track with the indicator of the capacity operating rate simultaneously showing instantaneous state of the changing capacity operating rate while the sliding motion of the free setting operator is being conducted, wherein the state shown in the indicator of the capacity operating rate can be the operating percentage, the operating chart or the actual operating value of the at least one operating parameter, wherein a full length of the virtual track represents a simulation of the value of the maximum operating capacity of the at least one operating parameter, wherein the capacity operating rate is determined by a parking location of the free setting operator on the virtual track when the sliding motion stops.

48. The LED security light according to claim 46, wherein the capacity scale simulator is a capacity free running process and the free setting operator is a virtual button, wherein the free setting algorithm is implemented by the visual configuration of the virtual button, the capacity free running process integrated with the virtual button and an indicator of the capacity operating rate, wherein the virtual button is designed on the touch screen panel of the mobile device, wherein when the virtual button is continuously touched by a user's finger or a touch pen, the user interface APP operates to activate the capacity free running process to gradually increase the capacity operating rate from a minimum level to a maximum level and then from the maximum level to the minimum level to complete a full cycle of free running motion, wherein during a free running cycle period the instantaneous state of the changing capacity operating rate is simultaneously shown in the indicator of the capacity operating rate, wherein the state of capacity operating rate can be the operating percentage, the operating chart or the actual operating value of the at least one operating parameter, wherein the moment at which the user's finger or the touch pen is removed from the virtual button, the free running motion is instantly ceased with the capacity operating rate thereby being locked in at the instantaneous level of the last moment of the free running motion, wherein the time length of a half cycle period of the free running motion represents a simulation of the value of the maximum operating capacity of a relevant operating parameter, wherein the capacity operating rate is determined by the time length the user's finger or the touch pen staying in touch screen panel with the virtual button compared with the time length of a half cycle period of the free running motion.

49. The LED security light according to claim 40, wherein the controller is a microcontroller programmable for generating the control signal.

50. The LED security light according to claim 40, wherein the controller is an application specific integrated circuit (ASIC) customized for generating the control signal.

51. The LED security light according to claim 40, wherein the mobile device is a mobile phone, a pad, a PDA, a notebook, a smart watch, a smart speaker or a remote controller, featured with a capacity to download the user interface APP from an Internet or a cloud server for controlling and setting the at least one operating parameter of the LED security light.

52. The LED security light according to claim 51, wherein the free setting algorithm of the user interface APP is a voice recognition software preloaded in the smart speaker from the internet or the cloud server to transform a voice instruction of the user's setting decision into at least one operating variable of the at least one operating parameter of the LED security light and convert the at least one operating variable into the at least one wireless instruction signal for transmitting to the wireless external control signal receiver of the LED security light.

53. An on line free setting method for setting at least one operating parameter of a ceiling fan with light kit, comprising:
a user interface APP comprising at least one free setting algorithm preloaded in a mobile device to transform a user's setting decision into at least one operating variable of the at least one operating parameter of the ceiling fan with light kit;
wherein when the user interface APP is activated and concluded with at least one setting decision, the user interface APP manages to transmit via the mobile device at least one wireless instruction signal carrying at least one message of the at least one operating variable to the ceiling fan with light kit, wherein the at least one operating variable is used for processing at least one value of the at least one operating parameter of the ceiling fan with light kit; and
a controller of the ceiling fan with light kit, designed with a capacity to interpret the at least one wireless instruction signal received by a wireless external control signal receiver of the ceiling fan with light kit and accordingly manages to output at least one control signal to control and set the at least one value of at least one operating parameter of the ceiling fan with light kit;
wherein the at least one value of the at least one operating parameter is stored in a memory of the controller for repetitive performance, wherein the at least one value of the at least one operating parameter stored is replaceable by a processing of new operating variable(s) selected by the user;
wherein the at least one operating parameter is used for controlling at least one of various lighting and electrical characteristics of the ceiling fan with light kit including timer setting, fan speed setting, fan rotation direction setting, light intensity setting and light color temperature setting;
wherein the user interface APP is operable on a touch screen panel of the mobile device, wherein the free setting algorithm is a capacity scale simulation process implemented by a visual configuration of a free setting operator incorporated with a capacity scale simulator and an indicator of a capacity operating rate to facilitate the user's decision making process in setting a desired level of the at least one operating parameter, wherein when the free setting operator is activated by the user to interact with the capacity scale simulator, the user interface APP responsively manages to gradually and stepwise adjust a value of the capacity operating rate according to an instantaneous state of interaction between the free setting operator and the capacity scale simulator with the indicator of the capacity operating rate simultaneously showing the instantaneous state of a stepwise changing capacity operating rate, wherein the capacity operating rate shown in the indicator can be an operating percentage, an operating chart or an actual operating value of a relevant operating parameter, wherein when a free setting motion of the free setting operator is ceased, the user interface APP manages to generate the at least one operating variable corresponding to a selection of the capacity operating rate and accordingly operates to transmit the at least one wireless instruction signal carrying the at least one message of the at least one operating variable to the ceiling fan with light kit.

54. The on line free setting method for setting at least one operating parameter of a ceiling fan with light kit according to claim 53, wherein the mobile device is a mobile phone, a pad, a PDA, a notebook, a smart watch, a smart speaker or a remote controller featured with a capacity to download the user interface APP from an Internet or a cloud server for controlling and setting the at least one operating parameter of the ceiling fan with light kit.

55. The on line free setting method for setting at least one operating parameter of a ceiling fan with light kit according to claim 54, wherein the free setting algorithm of the user interface APP is a voice recognition software preloaded in the smart speaker from the internet or the cloud server to transform a voice instruction of the user's setting decision into at least one operating variable of the at least one operating parameter of the ceiling fan with light kit and convert the at least one operating variable into the at least one wireless instruction signal for transmitting to the wireless external control signal receiver of the ceiling fan with light kit.

56. The on line free setting method for setting at least one operating parameter of a ceiling fan with light kit according to claim 53, wherein the ceiling fan is a DC motor fan and the light kit is a LED lighting device.

57. The on line free setting method for setting at least one operating parameter of a ceiling fan with light kit according to claim 30, wherein the capacity scale simulator is a virtual track, wherein the free setting algorithm is implemented by the visual configuration of the free setting operator, the virtual track coupled with the free setting operator and the indicator of the capacity operating rate, wherein the free setting operator is slidable by the user's finger or a touch pen along the virtual track with the indicator of the capacity operating rate simultaneously showing the instantaneous state of the changing capacity operating rate while the sliding motion of the free setting operator is being conducted, wherein the state shown in the indicator of the capacity operating rate can be the operating percentage, the operating chart or the actual operating value of the at least one operating parameter, wherein the full length of the virtual track represents a simulation of the value of the maximum operating capacity of the at least one operating parameter, wherein the capacity operating rate is determined by a parking location of the free setting operator on the virtual track when the sliding motion stops.

58. The on line free setting method for setting at least one operating parameter of a ceiling fan with light kit according to claim 30, wherein the capacity scale simulator is a capacity free running process and the free setting operator is a virtual button, wherein the free setting algorithm is implemented by the visual configuration of the virtual button, the capacity free running process integrated with the virtual button and the indicator of the capacity operating rate, wherein the virtual button is designed on the touch screen panel of the mobile device, wherein when the virtual button is continuously touched by a user's finger or a touch pen, the user interface APP operates to activate the capacity free running process to gradually increase the capacity operating rate from a minimum level to a maximum level and then from the maximum level to the minimum level to complete a full cycle of free running motion, wherein during a free running cycle period the instantaneous state of the changing capacity operating rate is simultaneously shown in the indicator of the capacity operating rate, wherein the state of capacity operating rate can be the operating percentage, the operating chart or the actual operating value of the at least one operating parameter, wherein the moment at which the user's finger or the touch pen is removed from the virtual button, the free running motion is instantly ceased with the capacity operating rate thereby being locked in at an instantaneous level of the last moment of the free running motion, wherein the time length of a half cycle period of the free running motion represents a simulation of the value of the maximum operating capacity of a relevant operating parameter, wherein the capacity operating rate is determined by the time length the user's finger or the touch pen staying in touch screen panel with the virtual button compared with the time length of a half cycle period of the free running motion.

59. The on line free setting method for setting at least one operating parameter of a ceiling fan with light kit according to claim 30, wherein the mobile device is a mobile phone, a pad, a PDA, a notebook, a smart watch, a smart speaker or a remote controller, featured with a capacity to download the user interface APP from an Internet or a cloud server.

60. The on line free setting method for setting at least one operating parameter of a ceiling fan with light kit according to claim 59, wherein the free setting algorithm of the user interface APP is a voice recognition software preloaded in the smart speaker from the internet or the cloud server to transform a voice instruction of the user's setting decision into at least one operating variable of the at least one operating parameter of the ceiling fan with light kit and convert the at least one operating variable into the at least one wireless instruction signal for transmitting to the wireless external control signal receiver of the ceiling fan with light kit.

\* \* \* \* \*

UNITED STATES PATENT AND TRADEMARK OFFICE
CERTIFICATE OF CORRECTION

PATENT NO. : 10,667,367 B2  
APPLICATION NO. : 16/173269  
DATED : May 26, 2020  
INVENTOR(S) : Chia-Teh Chen Page 1 of 1

It is certified that error appears in the above-identified patent and that said Letters Patent is hereby corrected as shown below:

In the Specification

Column 3, Line 67, the term "capacitor" should read --capacity--

Column 25, Line 25, the term "capacitor" should read --capacity--

In the Claims

Column 33, Line 54, Claim 1 the term "wireless signal receiver" should read --wireless receiver--

Column 35, Lines 24-25, Claim 4 the term "wireless signal receiver" should read --wireless receiver--

Column 35, Line 50, Claim 5 the term "wireless signal receiver" should read --wireless receiver--

Column 36, Lines 58-59, Claim 9 the term "wireless signal receiver" should read --wireless receiver--

Column 38, Line 44, Claim 14 the term "capacitor" should read --capacity--

Column 42, Line 6, Claim 28 the term "capacitor" should read --capacity--

Column 48, Line 53, Claim 57 for the claim reference numeral "30" should read --53--

Column 49, Line 7, Claim 58 for the claim reference numeral "30" should read --53--

Column 50, Line 12, Claim 59 for the claim reference numeral "30" should read --53--

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*